United States Patent
Okubo et al.

(10) Patent No.: US 9,561,771 B2
(45) Date of Patent: Feb. 7, 2017

(54) SEAT BELT DEVICE

(71) Applicant: KABUSHIKI KAISHA TOKAI-RIKA-DENKI-SEISAKUSHO, Aichi (JP)

(72) Inventors: Shinichi Okubo, Aichi (JP); Haruhiko Hashimoto, Aichi (JP); Masaru Ukita, Aichi (JP); Takahiro Hamada, Aichi (JP); Tomonari Umakoshi, Aichi (JP)

(73) Assignee: KABUSHIKI KAISHA TOKAI-RIKA-DENKI-SEISAKUSHO, Aichi (JP)

( * ) Notice: Subject to any disclaimer, the term of this patent is extended or adjusted under 35 U.S.C. 154(b) by 0 days.

(21) Appl. No.: 15/029,791

(22) PCT Filed: Oct. 17, 2014

(86) PCT No.: PCT/JP2014/077734
§ 371 (c)(1),
(2) Date: Apr. 15, 2016

(87) PCT Pub. No.: WO2015/056794
PCT Pub. Date: Apr. 23, 2015

(65) Prior Publication Data
US 2016/0236641 A1  Aug. 18, 2016

(30) Foreign Application Priority Data
Oct. 18, 2013 (JP) .................................. 2013-217700

(51) Int. Cl.
*B60R 21/18* (2006.01)
*B60R 22/12* (2006.01)
(Continued)

(52) U.S. Cl.
CPC ............. *B60R 21/18* (2013.01); *B60R 21/231* (2013.01); *B60R 21/237* (2013.01); *B60R 22/12* (2013.01);
(Continued)

(58) Field of Classification Search
CPC ........... B60R 21/18; B60R 22/12; B60R 22/26
See application file for complete search history.

(56) References Cited

U.S. PATENT DOCUMENTS 3,841,654 A * 10/1974 Lewis ...................... B60R 21/18
280/733
5,474,326 A * 12/1995 Cho ......................... B60R 21/18
280/733
(Continued)

FOREIGN PATENT DOCUMENTS

JP  2002-002442 A  1/2002
JP  2002502750 A  1/2002
(Continued)

*Primary Examiner* — Faye M Fleming
(74) *Attorney, Agent, or Firm* — Roberts Mlotkowski Safran Cole & Calderon P.C.

(57) ABSTRACT

A seatbelt device comprises a webbing, a bag body and an anchor member. The webbing is applied to the body of a vehicle occupant sitting on a seat. The bag body is provided along a length direction of the webbing, and the bag body is disposed at one side of the webbing and can be inflated by pressure of a fluid supplied from a length direction one side of the bag body. A deployment portion through which the fluid can pass is provided in the bag body, being disposed at width direction outer sides and a thickness direction another side of the webbing. An insertion hole is formed in the anchor member, through which the webbing and the bag body are inserted. The webbing is folded at the thickness direction one side when applied to the body of the sitting (Continued)

vehicle occupant, and the deployment portion of the bag body is disposed in the insertion hole.

10 Claims, 25 Drawing Sheets

(51) Int. Cl.
    *B60R 22/14*     (2006.01)
    *B60R 21/231*     (2011.01)
    *B60R 21/237*     (2006.01)
    *B60R 22/28*     (2006.01)
    *B60R 21/00*     (2006.01)
    *B60R 22/18*     (2006.01)

(52) U.S. Cl.
    CPC ............... *B60R 22/14* (2013.01); *B60R 22/28* (2013.01); *B60R 2021/0032* (2013.01); *B60R 2021/0044* (2013.01); *B60R 2021/0055* (2013.01); *B60R 2021/0058* (2013.01); *B60R 2022/1806* (2013.01); *B60R 2022/1812* (2013.01); *B60R 2022/282* (2013.01)

(56) References Cited

U.S. PATENT DOCUMENTS

| | | | |
|---|---|---|---|
| 6,279,945 B1* | 8/2001 | Schneider | B60R 21/18 280/733 |
| 6,340,173 B1* | 1/2002 | Specht | B60R 21/18 280/733 |
| 6,419,264 B1* | 7/2002 | Tsuji | B60R 21/18 280/733 |
| 2002/0027344 A1* | 3/2002 | Decomps | B60R 21/18 280/733 |
| 2007/0001435 A1 | 1/2007 | Gray et al. | |
| 2007/0102909 A1* | 5/2007 | Nezaki | B60R 21/18 280/733 |

FOREIGN PATENT DOCUMENTS

| | | |
|---|---|---|
| JP | 2008247087 A | 10/2008 |
| JP | 2012121431 A | 6/2012 |

* cited by examiner

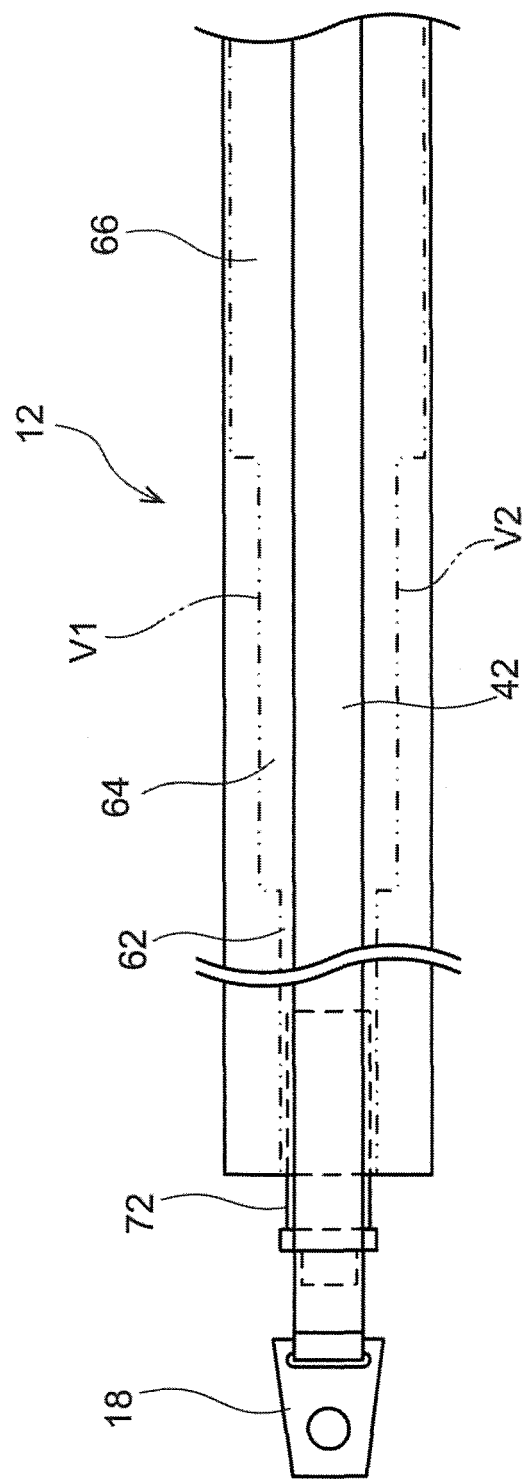

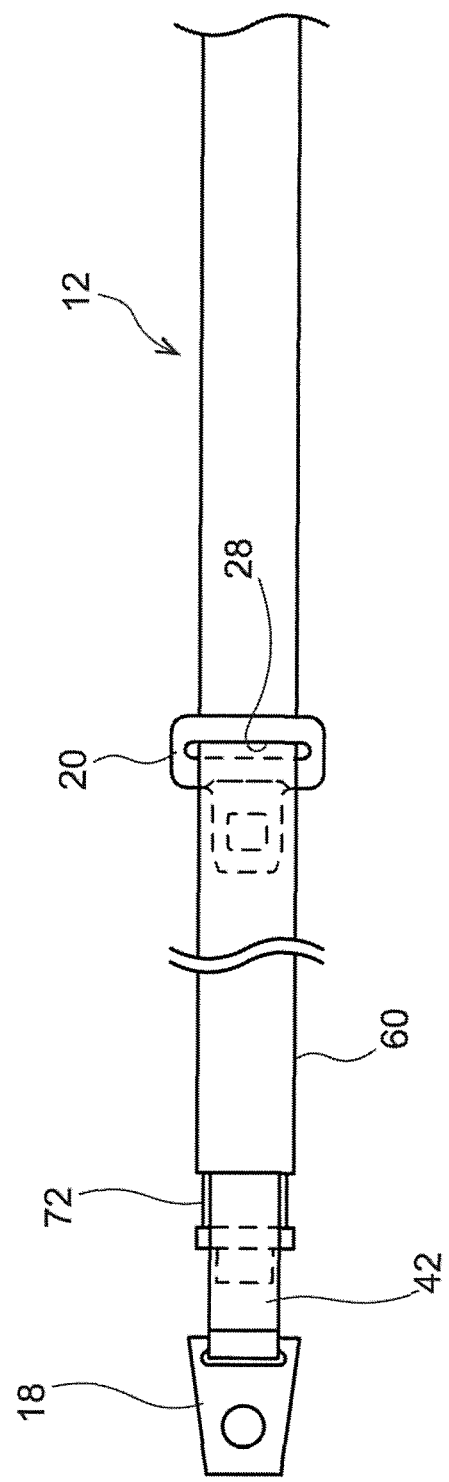

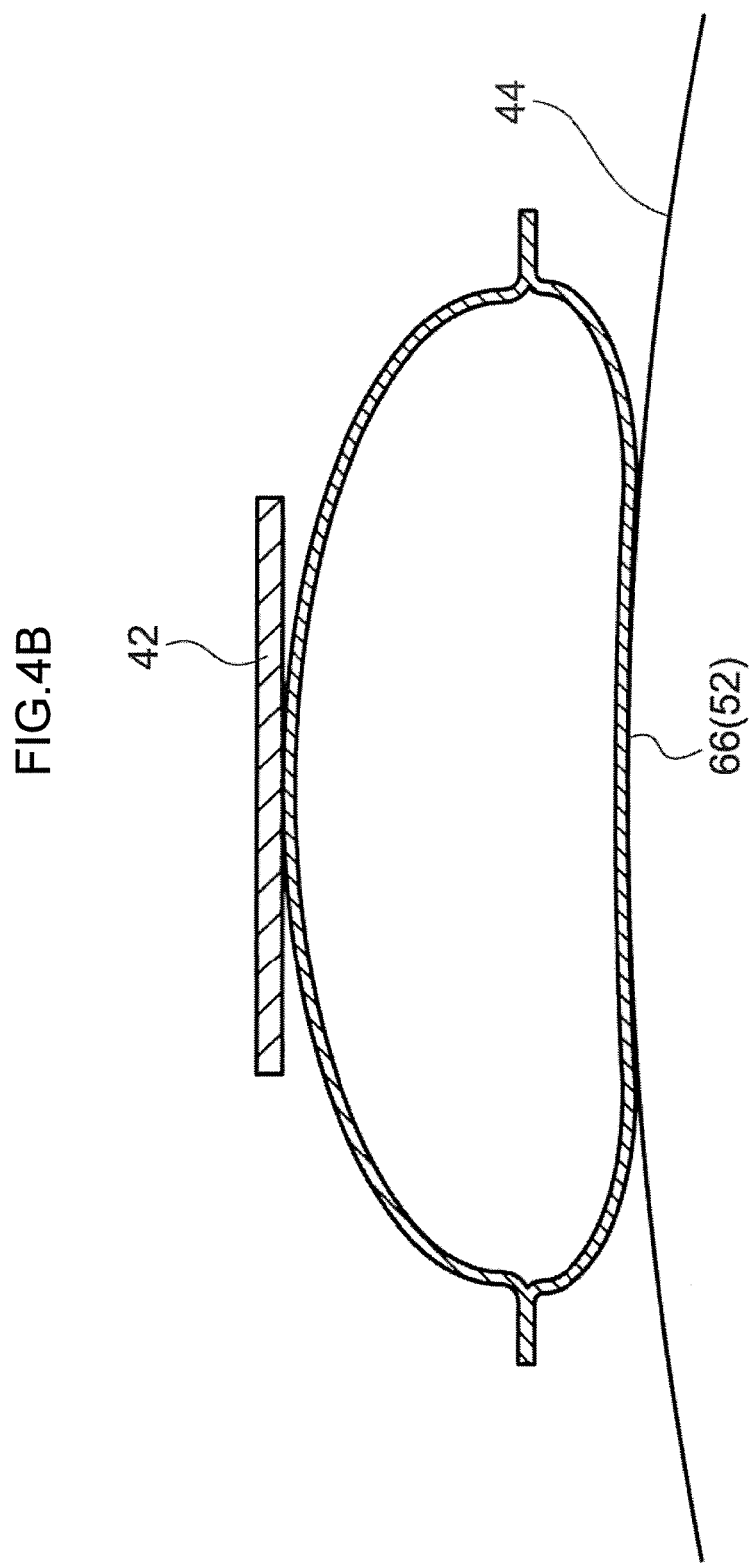

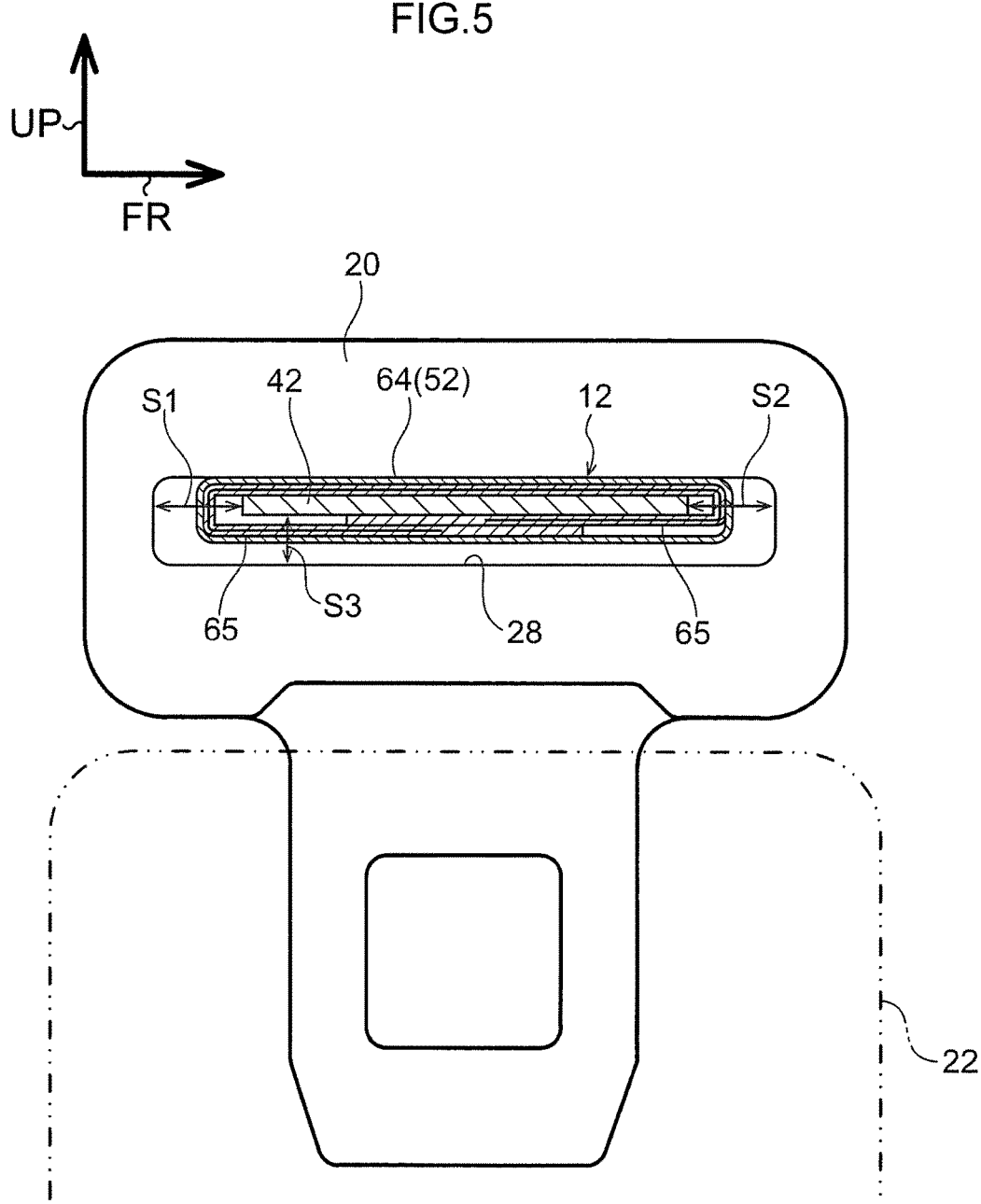

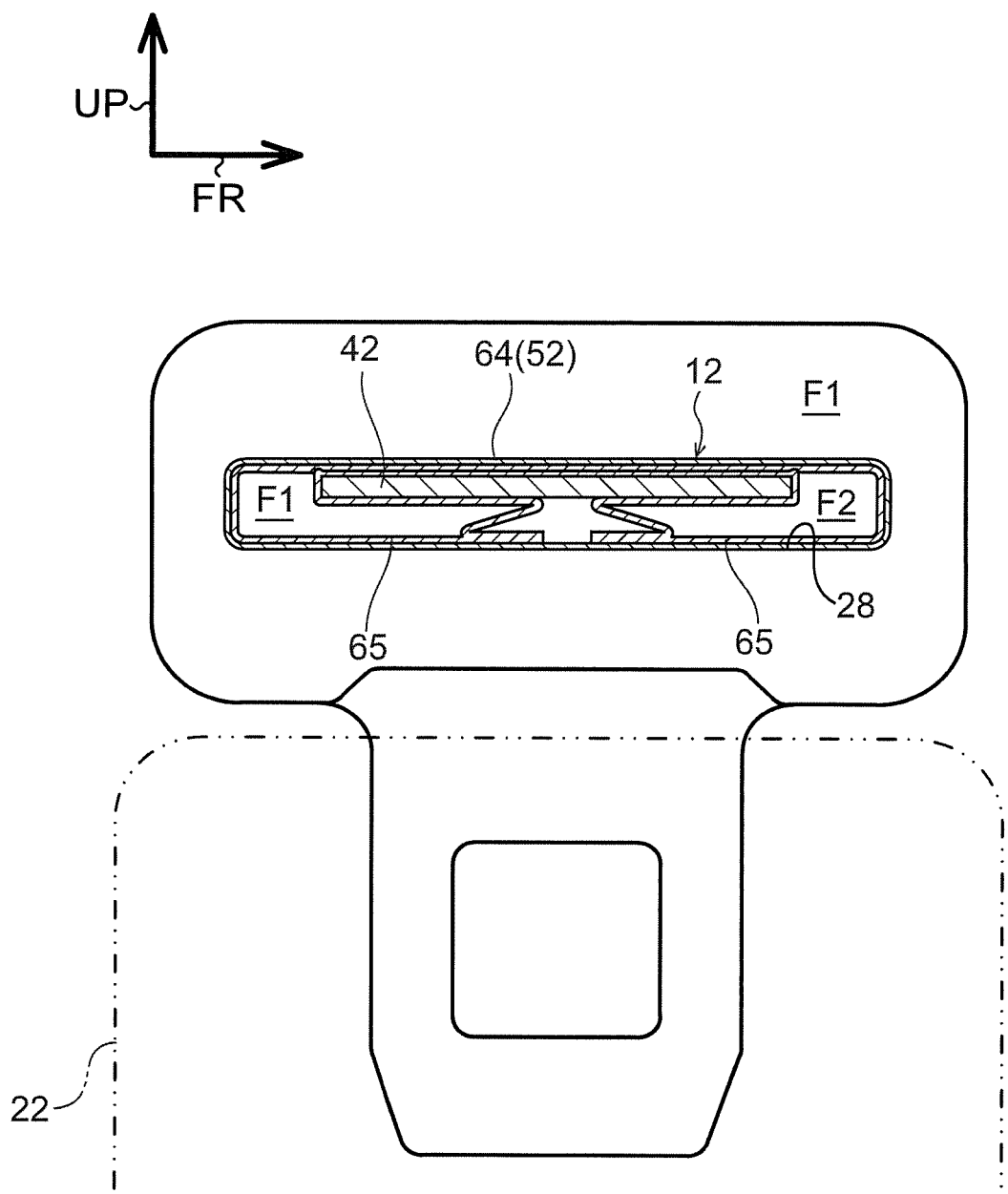

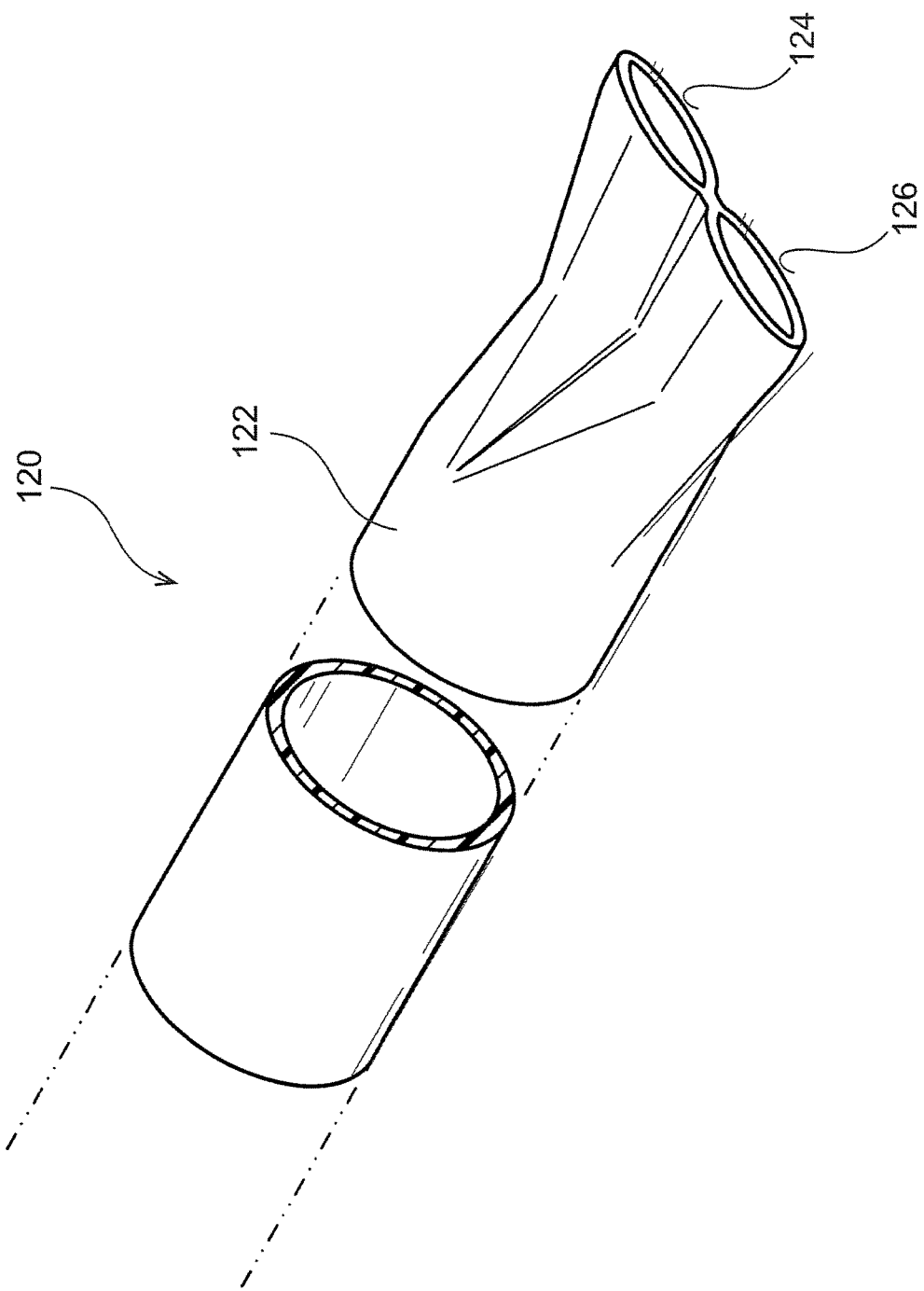

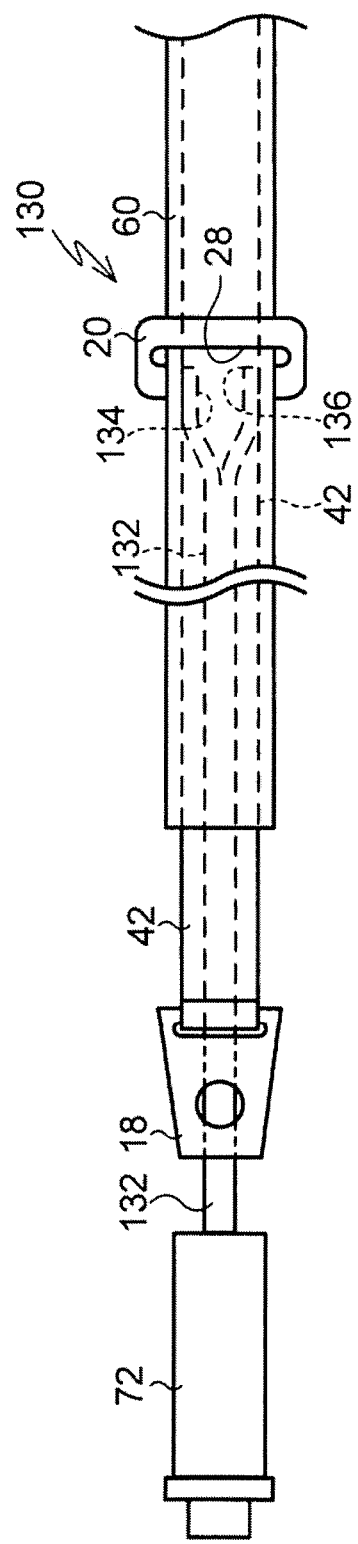

SEAT BELT DEVICE

CROSS-REFERENCE TO RELATED APPLICATIONS

The present application is a U.S. National Phase of PCT/JP2014/077734 filed on Oct. 17, 2014 claiming priority to Japanese Patent application No. 2013-217700 filed Oct. 18, 2013. The disclosure of the PCT Application is hereby incorporated by reference into the present Application.

TECHNICAL FIELD

The present invention relates to a seatbelt device equipped with a bag body that inflates and expands at a time of emergency.

BACKGROUND ART

There is a seatbelt device in which, when there is a vehicle collision, gas produced in an inflator is supplied through a tube into a seatbelt and the seatbelt is inflated and expanded by pressure of the gas (for example, see Japanese National Phase-Publication No. 2002-502750).

In this structure, the tube is disposed inside the seatbelt. Therefore, if the tube is folded together with the seatbelt at a penetrating hole in a tongue, a shoulder belt anchor or the like, the tube is crushed by the seatbelt, as a result of which it is difficult for the gas to pass through.

SUMMARY OF INVENTION

Technical Problem

In consideration of the circumstances described above, the present invention provides a seatbelt device in which a fluid may easily pass through a folding position of a bag body.

Solution to Problem

A seatbelt device according to a first aspect of the present invention includes: a webbing that is configured to be applied to the body of a vehicle occupant sitting on a seat; a bag body that is disposed along a length direction of the webbing, wherein the bag body is disposed at one side of the webbing, the bag body is inflatable by pressure of a fluid supplied from a length direction one side of the bag body, and a deployment portion through which the fluid can pass is provided in the bag body, wherein the deployment portion is disposed at at least one of a width direction outer side and a thickness direction another side of the webbing; and an anchor member in which an insertion hole is formed, the webbing and the bag body are inserted through the insertion hole, the webbing is folded back at the thickness direction one side at the insertion hole when the webbing is applied to the body of the sitting vehicle occupant, and the deployment portion of the bag body is disposed inside the insertion hole.

According to the seatbelt device of the first aspect, the deployment portion of the bag body is disposed at at least one of the width direction outer side and the thickness direction other side of the webbing, and is disposed inside the insertion hole of the anchor member. Therefore, even when, for example, the webbing and the bag body are folded at the thickness direction one side of the webbing at the insertion hole of the anchor member, the fluid supplied from the length direction one side of the bag body can easily pass through a folding position of the bag body at the anchor member via the deployment portion.

A seatbelt device according to a second aspect of the present invention, in the seatbelt device according to the first aspect, the bag body includes a non-inflating portion that cannot be inflated, the non-inflating portion is formed in the bag body at the thickness direction one side of the webbing, and the non-inflating portion is structured so as to be located at a position in a length direction of the bag body such that a folding position of the bag body at the anchor member is encompassed in the position when the webbing is applied to the body of the sitting vehicle occupant.

According to the seatbelt device of the second aspect, the non-inflating portion that is incapable of expanding is formed at a thickness direction one side of the bag body. The non-inflating portion is formed at a length direction position that encompasses the folding position of the bag body at the anchor member when the webbing is applied to the body of a seated vehicle occupant. Therefore, when the fluid is supplied from the length direction one side of the bag body, the bag body does not expand at the thickness direction one side of the webbing at positions of the non-inflating portion. As a result, the fluid is supplied to the deployment portion of the bag body effectively, and the fluid passes through the deployment portion efficiently.

In a seatbelt device according to a third aspect of the present invention, in the seatbelt device according to the first aspect or the second aspect, the bag body further includes: a main body portion that is configured to inflate at a chest front side of the vehicle occupant when the webbing is applied to the body of the sitting vehicle occupant; and a fluid passage portion that is provided at the length direction one side of the bag body relative to the main body portion, a width dimension of the fluid passage portion being smaller than a width dimension of the main body portion, and the fluid passing through the fluid passage portion and flowing into the main body portion when the webbing is applied to the body of the sitting vehicle occupant.

According to the seatbelt device of the third aspect, when the fluid is supplied to the bag body, the fluid passes through the fluid passage portion and flows into the main body portion. As a result, the main body portion expands at the chest front side of the vehicle occupant. At this time, because the width dimension of the fluid passage portion is smaller than the width dimension of the main body portion, an amount of fluid required to inflate the fluid passage portion is reduced. Therefore, the pressure of the fluid effectively contributes to the inflation of the main body portion, as a result of which pressure of the fluid in the main body portion is increased.

A seatbelt device according to a fourth aspect of the present invention, in the seatbelt device according to the third aspect, the bag body further includes an intermediate passage portion provided between the main body portion and fluid passage portion of the bag body, the intermediate passage portion is insertable through the insertion hole in the state in which the webbing is applied to the body of the vehicle occupant, a width dimension of the intermediate passage portion is smaller than the width dimension of the main body portion and larger than the width dimension of the fluid passage portion, and the fluid passes through the intermediate passage portion from the fluid passage portion toward the main body portion.

According to the seatbelt device of the fourth aspect, the intermediate passage portion is provided between the main body portion and the fluid passage portion of the bag body, and the intermediate passage portion is insertable through the insertion hole of the anchor member in the state in which the webbing is applied to the body of the vehicle occupant. In this structure, because the width dimension of the intermediate passage portion is smaller than the width dimension of the main body portion, an amount of fluid required to inflate the intermediate passage portion is reduced, as a result of which pressure of the fluid in the main body portion can be increased. Meanwhile, because the width dimension of the intermediate passage portion is larger than the width dimension of the fluid passage portion, the intermediate passage portion can be inflated to be larger than the fluid passage portion.

A seatbelt device according to a fifth aspect of the present invention, in the seatbelt device according to any of the first aspect to the fourth aspect, further includes a tubular member that is provided with a distal end and a proximal end, the tubular member is structured such that, when the webbing is applied to the body of the sitting vehicle occupant, the distal end of the tubular member is disposed at the length direction one side of the bag body relative to the insertion hole of the anchor member and the proximal end is disposed further to the length direction one side of the bag body than the distal end, the fluid is supplied into the tubular member from the proximal end and the tubular member discharges the fluid from the distal end into the bag body.

According to the seatbelt device of the fifth aspect, the distal end of the tubular member is provided inside the bag body at the length direction one side of the bag body relative to the insertion hole of the anchor member. The proximal end of the tubular member is disposed further to the length direction one side of the bag body than the distal end. The fluid that is supplied into the tubular member through the proximal end of the tubular member is discharged through the distal end of the tubular member into the bag body. Therefore, little of the fluid is used for inflation at the length direction one side of the bag body relative to the distal end of the tubular member. Thus, the fluid is efficiently supplied to the length direction other side of the bag body relative to the distal end of the tubular member.

In a seatbelt device according to a sixth aspect of the present invention, in the seatbelt device according to the fifth aspect, the distal end of the tubular member is disposed at a side of the bag body at which the deployment portion is disposed.

According to the seatbelt device of the sixth aspect, because the distal end of the tubular member is disposed at a deployment portion side of the bag body, the fluid that is discharged through the distal end of the tubular member is directed toward the deployment portion of the bag body. Therefore, the fluid can pass through the deployment portion effectively.

A seatbelt device according to a seventh aspect of the present invention, in the seatbelt device according to any of the first aspect to the fourth aspect, further includes a tubular member that is provided with a distal end and a proximal end, the tubular member is structured such that, when the webbing is applied to the body of the sitting vehicle occupant, the distal end side of the tubular member is provided inside the deployment portion of the bag body and is disposed at the length direction other side relative to a folding position of the bag body at the anchor member, and the proximal end is disposed at the length direction one side of the bag body relative to the distal end, the fluid is supplied into the tubular member from the proximal end and the tubular member discharges the fluid from the distal end into the bag body.

According to the seatbelt device of the seventh aspect, the distal end side of the tubular member is disposed at the length direction other side relative to the folding position of the bag body at the anchor member. The fluid that is supplied into the tubular member through the proximal end of the tubular member is discharged through the distal end of the tubular member into the bag body. Therefore, little of the fluid is used for inflation at the length direction one side of the bag body relative to the distal end of the tubular member. Thus, the fluid is efficiently supplied to the length direction other side of the bag body relative to the distal end of the tubular member. Furthermore, because the tubular member is provided in the deployment portion of the bag body, crushing of the tubular member at the folding position of the bag body at the anchor member can be prevented or restrained. Therefore, the fluid can be efficiently supplied to the length direction other side of the bag body relative to the folding position of the bag body at the anchor member.

In a seatbelt device according to an eighth aspect of the present invention, in the seatbelt device according to any one of the fifth aspect to the seventh aspect, the length direction one side of the bag body relative to the distal end of the tubular member can be inflated by pressure of the fluid.

According to the seatbelt device of the eighth aspect, the length direction one side of the bag body interior relative to the distal end of the tubular member can be expanded by pressure of the fluid. Therefore, of the fluid that is discharged through the distal end of the tubular member, excess fluid that cannot pass through the deployment portion of the bag body circulates toward the length direction one side of the bag body interior relative to the distal end of the tubular member, and the length direction one side of the bag body interior relative to the distal end of the tubular member is expanded by the pressure of this fluid. Therefore, durability of the bag body against pressure of excess fluid and the like may be improved.

As described above, in a seatbelt device according to the present invention, fluid that is supplied from the length direction one side of the bag body can easily pass through a folding position of the bag body at the anchor member.

BRIEF DESCRIPTION OF DRAWINGS

FIG. 3A is a plan view of a state in which the bag body of the seatbelt device in accordance with the first exemplary embodiment is widened.

FIG. 3B is a plan view of a state in which a webbing and the bag body of the seatbelt device in accordance with the first exemplary embodiment are covered by a cover.

FIG. 4B is a sectional view of the webbing and bag body of the seatbelt device in accordance with the first exemplary embodiment, showing a state in which the bag body has been inflated and expanded by gas pressure.

FIG. 5 is a sectional view of a portion of the webbing and bag body of the seatbelt device in accordance with the first exemplary embodiment that is inserted through an insertion hole of a tongue.

FIG. 6 is a sectional view, corresponding to FIG. 5, showing a state in which deployment portions of the bag body are inflated and flow paths are formed.

FIG. 11 is a perspective view in which a distal end side of a tubular member of a seatbelt device in accordance with a fifth exemplary embodiment is magnified.

FIG. 12B is a plan view of a state in which a webbing and the bag body of the seatbelt device in accordance with the sixth exemplary embodiment are covered by a cover.

DESCRIPTION OF EMBODIMENTS

Exemplary Embodiments of the present invention are described in accordance with FIG. 1 to FIG. 20. In FIG. 1, FIG. 2, FIG. 5 and FIG. 6, the arrow FR indicates the front side of a seat 24 at which a seatbelt device 10 is employed, arrow LH indicates the left side of the seat 24, and arrow UP indicates the upper side of the seat 24.

The seatbelt device 10 is employed at the seat 24 at a vehicle front-left side (that is, a driver seat in a left hand drive vehicle or an assistant driver seat in a right hand drive vehicle). Therefore, when the seatbelt device 10 is employed at another of a seat that is not the seat 24 at the vehicle front-left side, such as a seat at a vehicle front-right side or the like, the structures of the seatbelt device 10 are provided with left and right switched.

Structures of a First Exemplary Embodiment

Figure 1:
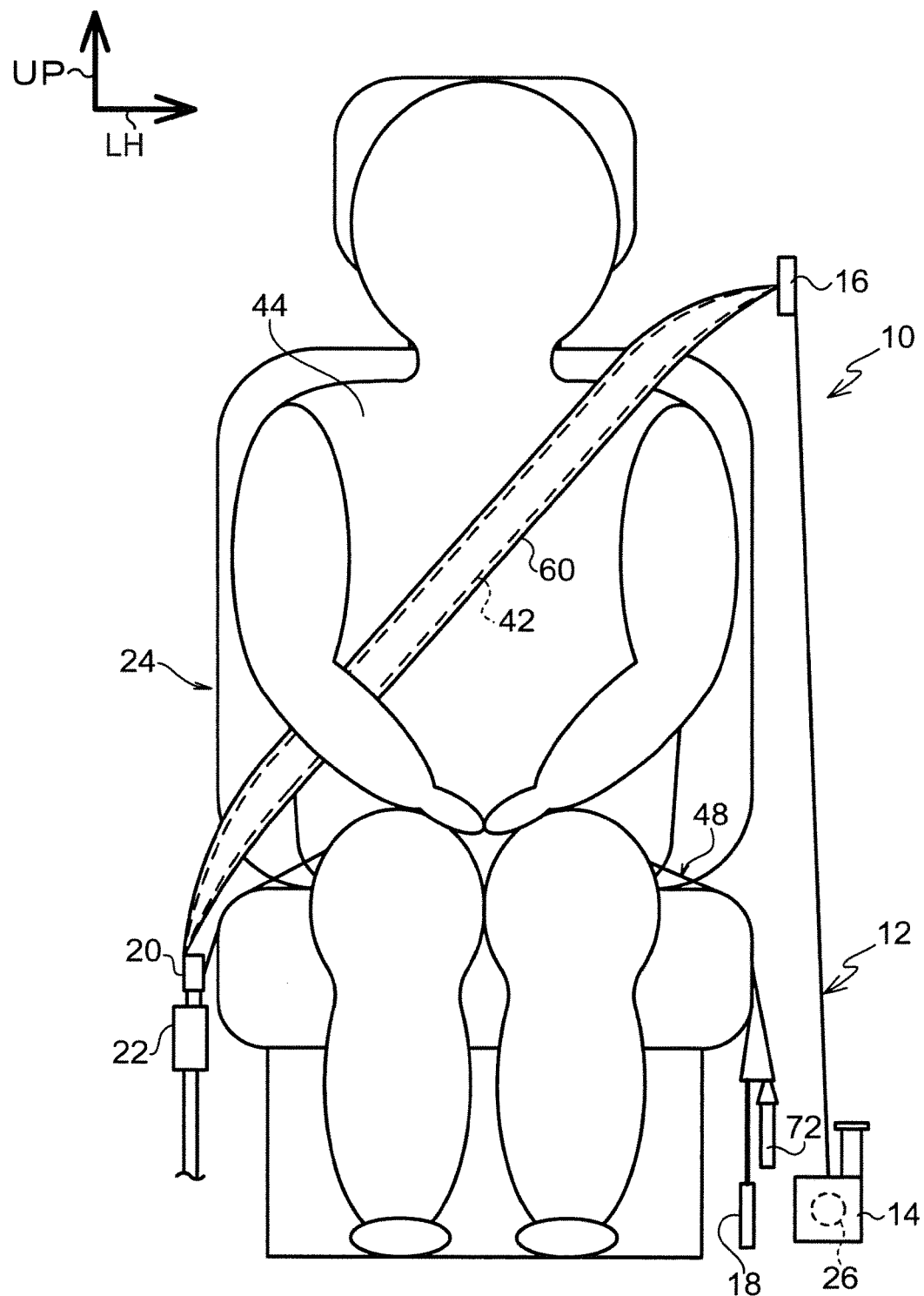
FIG. 1 is a front view of a seat at which a seatbelt device in accordance with a first exemplary embodiment is employed.
Figure 2:
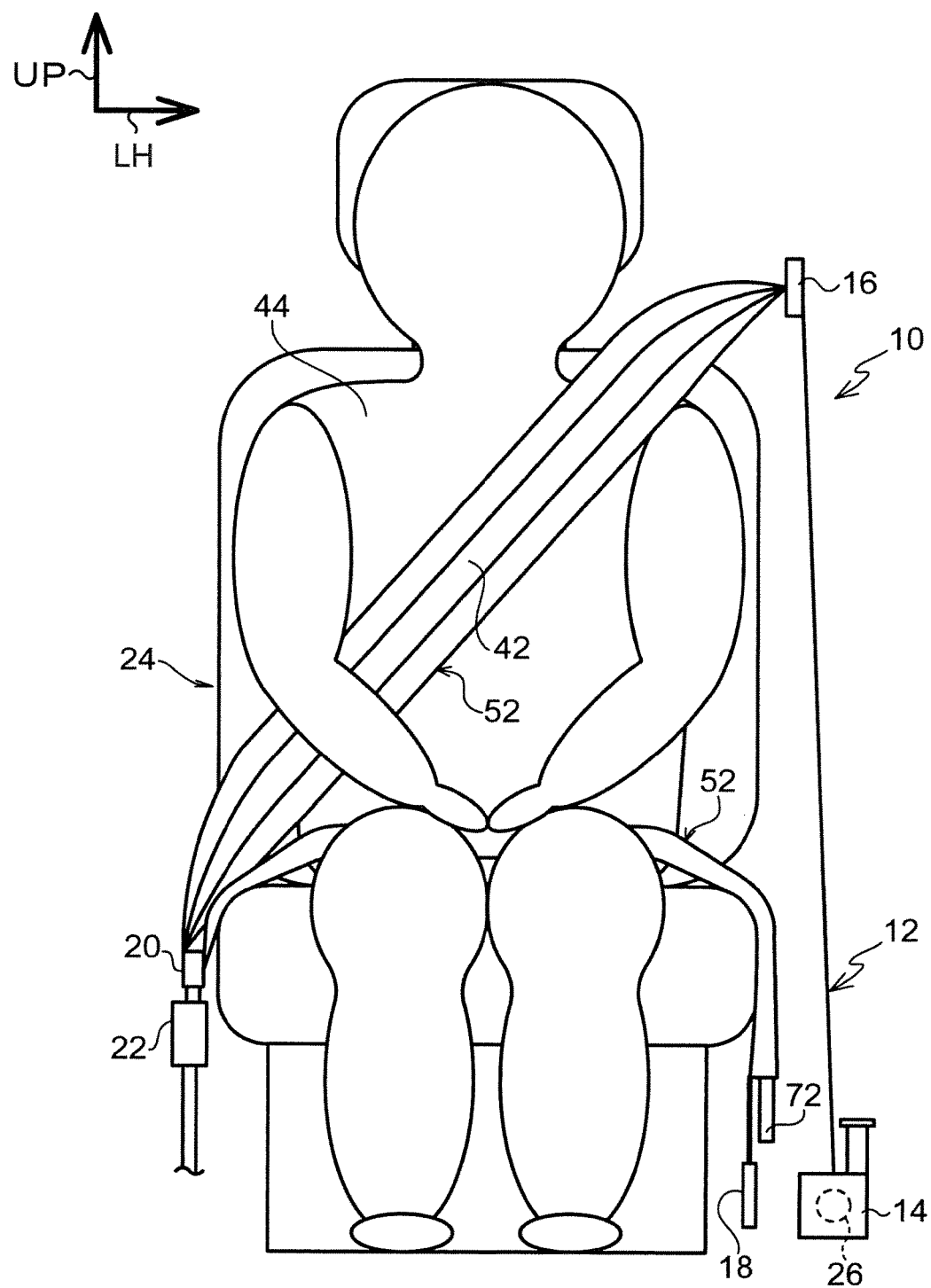
FIG. 2 is a front view, corresponding to FIG. 1, showing a state in which a bag body is inflated and expanded.

As shown in FIG. 1, the seatbelt device 10 according to a first exemplary embodiment is provided with a webbing take-up device 14. A frame of the webbing take-up device 14 is fixed to a vehicle body at a lower-left side of the seat 24. The frame of the webbing take-up device 14 is supported such that a spool 26 is freely rotatable. The spool 26 is urged in a take-up direction about a central axis thereof by a force of an urging member such as a spiral spring or the like. A length direction proximal end of a webbing 42 is anchored at the spool 26 and the webbing 42 extends to an upper side from the spool 26. When the spool 26 is turned in the take-up direction, the webbing 42 is taken up onto the spool 26. The webbing take-up device 14 is also provided with a lock mechanism, which is not shown in the drawings. The lock mechanism activates at a time of emergency, such as when there is a vehicle collision or the like. When the lock mechanism activates, rotation of the spool 26 in a pull-out direction, which is opposite to the take-up direction, is restricted by the lock mechanism.

A shoulder belt anchor 16 is provided at an upper side of the webbing take-up device 14. The shoulder belt anchor 16 is attached to a center pillar, which is an aspect of a side wall of the vehicle. An insertion hole is formed in the shoulder belt anchor 16. The webbing 42 extending to the upper side from the spool 26 of the webbing take-up device 14 is inserted through the insertion hole of the shoulder belt anchor 16 and folded back toward the lower side. An anchor plate 18 is provided at a lower-left side of the seat 24. The anchor plate 18 is fixed to the vehicle body or to a frame of the seat 24. A length direction distal end of the webbing 42 is anchored at the anchor plate 18.

A tongue 20 that serves as an anchor member is provided at the webbing 42 between the shoulder belt anchor 16 and the anchor plate 18. As shown in FIG. 5, an insertion hole 28 is formed in the tongue 20 and the webbing 42 is inserted through the insertion hole 28. Consequently, the tongue 20 may be moved along the webbing 42.

Correspondingly, as shown in FIG. 1, a buckle 22 is provided at a vehicle right side of the seat 24. The buckle 22 is fixed to the vehicle body, the frame of the seat 24 or the like. When the tongue 20 is fitted into the buckle 22, the tongue 20 is retained by the buckle 22. When the tongue 20 is retained at the buckle 22 in a state in which the webbing 42 is wrapped round the body of a vehicle occupant 44, a length direction middle portion of the webbing 42 is coupled to the buckle 22 via the tongue 20. Thus, the webbing 42 is in a state of application to the body of the vehicle occupant 44.

Figure 4A:
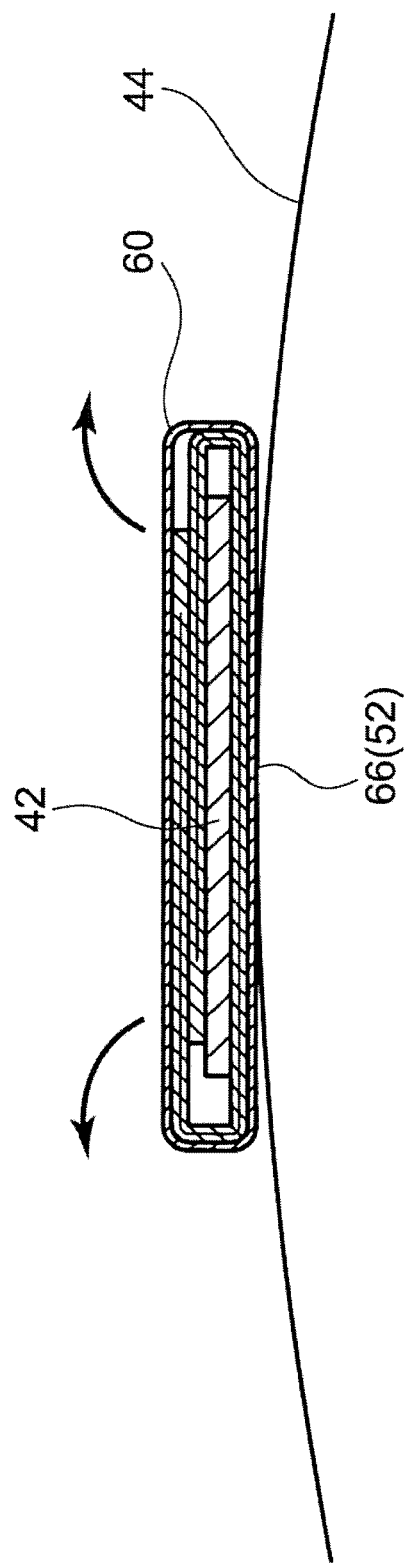
FIG. 4A is a sectional view of the webbing and bag body of the seatbelt device in accordance with the first exemplary embodiment, showing the state in which the webbing and bag body are covered by the cover.

As shown in FIG. 4A and FIG. 4B, a bag body 52 is provided at a thickness direction one side of the webbing 42. As shown in FIG. 3A, the bag body 52 is formed in a long, narrow shape and is provided along the webbing 42. The bag body 52 is fixed to the webbing 42 by sewing, adhesion, thermal welding or the like at appropriate positions of the webbing 42, and the bag body 52 is taken up onto the spool 26 of the webbing take-up device 14 together with the webbing 42. The bag body 52 is formed in a two-layer structure by double croth. Each of two width direction end sides of the bag body 52 (width direction outer sides relative to imaginary lines V1 and V2 in FIG. 3A) is formed into a single layer (a single croth) by a joining thread constituted of one or both of a weft and a warp that form the bag body 52. Therefore, the bag body 52 can be formed in a tube shape or a bag shape in a process of cloth fabrication.

As shown in FIG. 3A, the bag body 52 is provided with a gas passage portion 62 that serves as a fluid passage portion, an intermediate passage portion 64, and a main body portion 66. The gas passage portion 62, intermediate passage portion 64, and main body portion 66 are arranged in this order from a length direction one side of the bag body 52. The gas passage portion 62 opens out at the length direction one end of the bag body 52, and an inflator 72 that serves as a fluid supply device is fitted to an opening portion of the gas passage portion 62. The inflator 72 is electronically connected with an ECU that serves as a control device. The ECU is electronically connected to collision detection sensors such as load detection sensors, acceleration sensors and the like that are provided at the vehicle body. When a collision of the vehicle is detected by the collision detection sensors, the ECU activates the inflator 72. As a result, a gas that serves as a fluid is produced in the inflator 72, and the gas is supplied into the gas passage portion 62.

The intermediate passage portion 64 is formed to be wider than the gas passage portion 62 and the webbing 42. Two width direction end sides of the intermediate passage portion 64 protrude to outer sides of two width direction end portions of the webbing 42. The portions of the intermediate passage portion 64 that protrude to the outer sides of the two width direction end portions of the webbing 42 serve as deployment portions 65. The deployment portions 65 can be inflated by pressure of the gas supplied from the inflator 72. In the bag body 52, a location at which the bag body 52 transitions from the gas passage portion 62 to the intermediate passage portion 64 is specified such that the bag body 52 is inserted through the insertion hole 28 of the tongue 20 at an end portion vicinity of the intermediate passage portion 64 that is close to the gas passage portion 62, in an empty buckled state, that the vehicle occupant 44 is not sitting on the seat 24 but the webbing 42 is pulled out from the spool 26 of the webbing take-up device 14 and the tongue 20 is retained at the buckle 22.

The main body portion 66 is formed to be wider than the intermediate passage portion 64. Therefore, the main body portion 66 can inflate to be larger than the gas passage portion 62 and the intermediate passage portion 64. When the webbing 42 is applied to the body of the vehicle occupant 44, as shown in FIG. 4A, the main body portion 66 is disposed between the webbing 42 and the body of the vehicle occupant 44 in a region between the tongue 20 and the shoulder belt anchor 16. As shown in FIG. 4A and FIG. 5, both of the width direction sides of the bag body 52, having the structure described above, are bent at outer sides thereof relative to the width direction end portions of the webbing 42 and are folded over the thickness direction other side of the webbing 42. In this state, the bag body 52 and the webbing 42 are covered by a tubular cover 60.

As shown in FIG. 5, inside the insertion hole 28 of the tongue 20, gaps S1 and S2 are formed between the webbing 42 and periphery faces of the insertion hole 28 at the sides of the width direction end portions of the webbing 42, and a gap S3 is formed between the webbing 42 and a periphery face of the insertion hole 28 at a thickness direction other side of the webbing 42. Consequently, as shown in FIG. 6, the deployment portions 65 of the intermediate passage portion 64 of the bag body 52 can be inflated so as to fill the gaps S1, S2 and S3.

Operation and Effects of the First Exemplary Embodiment

In the present seatbelt device 10, the tongue 20 is gripped and pulled on by the vehicle occupant 44 sitting on the seat 24. As a result, the webbing 42 and bag body 52 are pulled out from the spool 26 of the webbing take-up device 14 and are wound round the body of the vehicle occupant 44 from the front side thereof. In this state, the tongue 20 is inserted into and retained in the buckle 22 and, as shown in FIG. 1, the webbing 42 and bag body 52 are applied to the body of the vehicle occupant 44.

In this state, if a collision condition of the vehicle is detected by the collision detection sensors, the inflator 72 is activated by the ECU. As a result, gas is produced by the inflator 72. The gas produced in the inflator 72 is supplied to the interior of the gas passage portion 62 of the bag body 52. The gas inflates and expands the gas passage portion 62 while passing therethrough. When the gas flows into the intermediate passage portion 64, the intermediate passage portion 64 is inflated and expanded by the gas.

The intermediate passage portion 64 of the bag body 52 is inserted through and folded back at a certain position of the intermediate passage portion 64 at the insertion hole 28 of the tongue 20. Therefore, the bag body 52 disposed at the thickness direction one side of the webbing 42 is pushed against by the webbing 42 and is pressed against a periphery face of the insertion hole 28, via the cover 60. Consequently, it is difficult to inflate the bag body 52 in the insertion hole 28 at the width direction central side of the bag body 52.

Note that, the deployment portions 65 of the bag body 52 protrude to the outer sides relative to the width direction end portions of the webbing 42 and are folded over the thickness direction other side of the webbing 42. Therefore, when the gas reaches the intermediate passage portion 64, as shown in FIG. 6, the deployment portions 65 of the intermediate passage portion 64 inflate so as to fill the gaps S1, S2 and S3 (see FIG. 5) between the webbing 42 and the periphery faces of the insertion hole 28. As a result, flow paths F1 and F2 for the gas are formed at the two width direction sides and the thickness direction other side of the webbing 42. Consequently, even though the width direction central side of the intermediate passage portion 64 does not inflate at the insertion hole 28, the gas passes along the flow paths F1 and F2 formed in the deployment portions 65. Thus, the gas may easily flow to the side at which the main body portion 66 is disposed. Hence, the main body portion 66 can be efficiently inflated and expanded.

The gas produced in the inflator 72 reaches the main body portion 66 and inflates and expands the main body portion 66 after the gas passage portion 62 and the intermediate passage portion 64 have been inflated and expanded. In this structure, the width dimensions of the gas passage portion 62 and the intermediate passage portion 64 are smaller than that of the main body portion 66. Therefore, the gas passage portion 62 and the intermediate passage portion 64 are inflated and expanded quickly by small amounts of gas. Therefore, the gas can be supplied to the main body portion 66 efficiently. As a result, pressure in the inflated state of the main body portion 66 is increased and the main body portion 66 is inflated and expanded quickly. In addition, because amounts of the gas used for the inflation and expansion of the gas passage portion 62 and the intermediate passage portion 64 are small, the main body portion 66 can be thoroughly inflated and expanded even if a gas production amount of the inflator 72 is small. Therefore, the inflator 72 can be reduced in size.

During the vehicle collision, the body of the vehicle occupant 44 acts to move by inertia toward the vehicle front side. At this time, the load of the body of the vehicle occupant 44 is supported directly by the webbing 42 or indirectly via the inflated and expanded main body portion 66. Therefore, inertial movement of the body of the vehicle occupant 44 may be restrained effectively. Meanwhile, the body of the vehicle occupant 44 is subjected to a load from the vehicle front side, from the webbing 42. In this structure, because the main body portion 66 of the bag body 52 is inflated and expanded between the chest of the vehicle occupant 44 and the webbing 42, a portion of the load by the webbing 42 from the vehicle front side is absorbed by the inflated and expanded main body portion 66 and moderated. Moreover, because the width dimension of the inflated and expanded main body portion 66 is larger than that of the webbing 42, the load from the body of the vehicle occupant 44 may be borne over a larger area of the main body portion 66 than the webbing 42, as a result of which the load exerted on the body of the vehicle occupant 44 may be moderated.

A pull-out amount of the webbing 42 and the bag body 52 from the spool 26 varies depending on the body shape of the vehicle occupant 44 and the like. Therefore, the folding position of the webbing 42 and the bag body 52 at the insertion hole 28 of the tongue 20 varies depending on the body shape of the vehicle occupant 44 and the like. In this structure, the folding position of the bag body 52 in the insertion hole 28 of the tongue 20 is specified to be disposed at the intermediate passage portion 64. Moreover, positions of the intermediate passage portion 64 of the bag body 52 are specified such that when the tongue 20 is retained at the buckle 22, even in the empty buckled state (a state in which the vehicle occupant 44 is not sitting on the seat 24, which is to say a case in which a pull-out amount of the webbing 42 from the spool 26 is small), an end portion vicinity of the intermediate passage portion 64 that is close to the gas passage portion 62 is disposed at the insertion hole 28 of the buckle 22. Therefore, in a state in which the webbing 42 is applied to the body of the vehicle occupant 44, the intermediate passage portion 64 is inserted through the insertion hole 28 at a portion of the intermediate passage portion 64 that is approached to the main body portion 66 from the end portion of the intermediate passage portion 64 at the gas passage portion 62 side.

Note that, the width dimension of the intermediate passage portion 64 is larger than that of the gas passage portion 62. Therefore, a portion of the intermediate passage portion 64 that locates between the insertion hole 28 of the tongue 20 and a main body portion 66 is inflated and expanded to be larger than the gas passage portion 62. Therefore, the portion of the intermediate passage portion 64 between the insertion hole 28 of the tongue 20 and a main body portion 66, which is disposed at a right side vicinity of the waist of the vehicle occupant 44, may absorb a portion of the load from the vehicle front side, similarly to the main body portion 66. In addition, the load from the body of the vehicle occupant 44 may be borne by an area of the portion of the intermediate passage portion 64 that is larger than the webbing 42.

In the present exemplary embodiment, it is specified that the intermediate passage portion 64 is between the gas passage portion 62 and the main body portion 6. However, structures are possible in which the intermediate passage portion 64 is not specified. In these structures, for example, the folding position of the bag body 52 at the insertion hole 28 of the tongue 20 is set at the main body portion 66, and protruding portions of the main body portion 66 to the outer sides at the two width direction end portions of the webbing 42 serve as the deployment portions 65.

In the present exemplary embodiment, the bag body 52 is formed by double cloth. However, the structure of the bag body 52 is not limited to such a structure. For example, a bag body may be formed by sewing together two sheet members, or a bag body may be formed by molding a synthetic resin material into a bag shape; structures other than structures based on double weavings may broadly be employed for the bag body.

Now, alternative embodiments are described. In the following descriptions of each exemplary embodiment, portions that are basically the same as in exemplary embodiments described above are assigned the same reference symbols and descriptions thereof may be omitted.

Second Exemplary Embodiment

Figure 7:
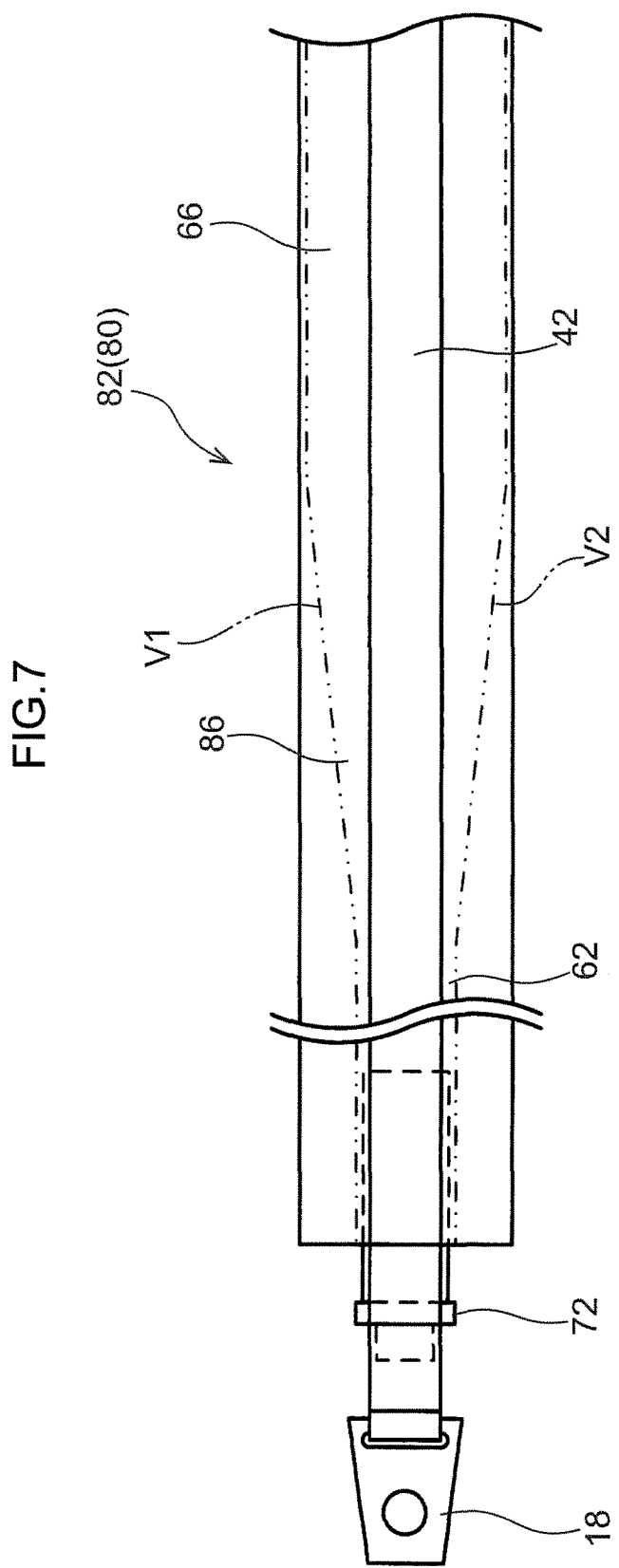
FIG. 7 is a plan view of a state in which a bag body of a seatbelt device in accordance with a second exemplary embodiment is widened.

As shown in FIG. 7, a seatbelt device 80 according to a second exemplary embodiment is provided with a bag body 82 instead of the bag body 52. The bag body 82 is provided with an intermediate passage portion 86 instead of the intermediate passage portion 64. A width dimension of the intermediate passage portion 86 gradually increases from a side thereof at which the gas passage portion 62 is disposed toward a side at which the main body portion 66 is disposed. The bag body 82 is folded up in a similar manner to the bag body 52 according to the first exemplary embodiment. Together with the webbing 42, the bag body 82 is covered by the cover 60 (which is not shown in FIG. 7). Similar effects to the first exemplary embodiment may be provided by this structure.

The first and second exemplary embodiments are structures in which the tongue 20 serves as the anchor member and the gas is supplied to the bag body 52 or 82 from the side of the tongue 20 at which the anchor plate 18 is disposed. However, the present invention may be applied to a structure in which, for example, the shoulder belt anchor 16 serves as the anchor member and the gas is supplied from a side from the shoulder belt anchor 16 at which the webbing take-up device 14 is disposed. In this case, it is sufficient that the intermediate passage portion 64 be provided so as to pass through an insertion hole of the shoulder belt anchor 16 in the state in which the webbing 42 and bag body 52 are applied to the body of the vehicle occupant 44, and that the gas passage portion 62 be provided at an opposite side of the intermediate passage portion 64 from a side at which the main body portion 66 is provided.

The exemplary embodiments described above have structures in which the bag body 52 is fixed to the webbing 42 at appropriate positions of the webbing 42. However, a structure is possible such that, for example, the bag body 52 is fixed to the webbing 42 at suitable intervals in the length direction of the webbing 42 and, in a state in which the webbing 42 is stretched in the length direction, the intermediate passage portion 64 is slack between the portions that are fixed to the webbing 42 (i.e., there is a margin in length of the intermediate passage portion 64). In this structure, even when a load is applied to the webbing 42 and the webbing 42 is tensed in the length direction thereof, because the intermediate passage portion 64 has slackness, the intermediate passage portion 64 is unlikely to be crushed and the flow paths F1 and F2 are easily formed.

Third Exemplary Embodiment

Figure 8A:
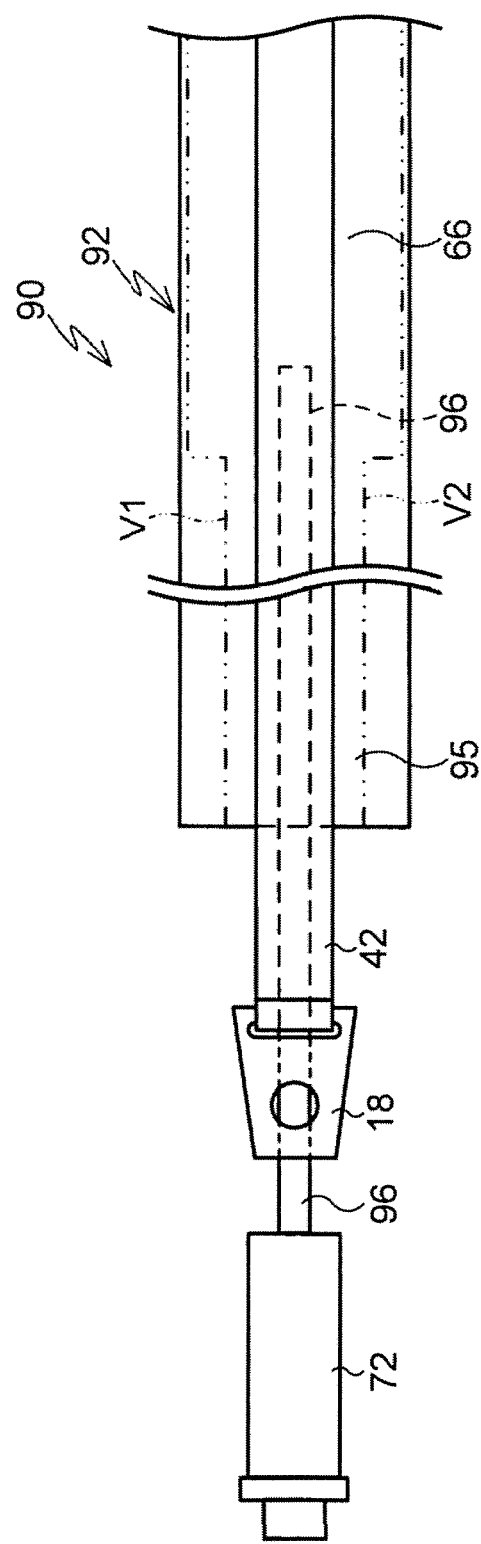
FIG. 8A is a plan view of a state in which a bag body of a seatbelt device in accordance with a third exemplary embodiment is widened.
Figure 8B:
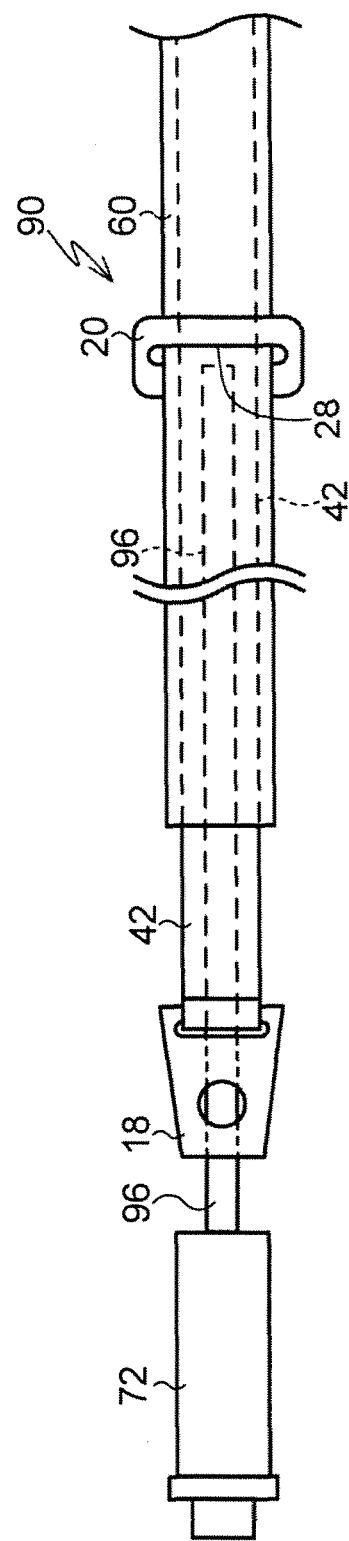
FIG. 8B is a plan view of a state in which a webbing and the bag body of the seatbelt device in accordance with the third exemplary embodiment are covered by a cover.

As shown in FIG. 8A and FIG. 8B, a seatbelt device 90 according to a third exemplary embodiment is provided with a bag body 92 instead of the bag body 52. The bag body 92 is provided with a narrow width portion 95 instead of the gas passage portion 62 and intermediate passage portion 64. A width dimension of the narrow width portion 95 is smaller than that of the main body portion 66, and the narrow width portion 95 opens out at the length direction one end of the bag body 92. The narrow width portion 95 is directly linked to the main body portion 66. In the present exemplary embodiment, it is specified that an end portion vicinity of the main body portion 66 that locates at a narrow width portion 95 side is disposed at the insertion hole 28 of the tongue 20 in the empty buckled state. Although not shown in the drawing of FIG. 8A, portions of the main body portion 66 that protrude to the outer sides of the two width direction end portions of the webbing 42 serve as the deployment portions 65.

The inflator 72 is not fitted at the bag body 92 but is provided outside the bag body 92. A tube 96 that serves as a tubular member is provided at the bag body 92. The tube 96 is formed in a tubular shape of which an internal diameter dimension is significantly smaller than the width dimension of the narrow width portion 95 of the bag body 92. A proximal end of the tube 96 is fitted to the inflator 72 outside the bag body 92. The distal end side of the tube 96 is disposed at the end portion vicinity of the main body portion 66 of the bag body 92 that is at the side where the narrow width portion 95 is disposed. A position of the distal end of the tube 96 is specified to be at a length direction one side of the bag body 92, that is at an anchor plate side relative to the insertion hole 28 of the tongue 20 in the empty buckled state. The bag body 92 is folded up in a similar manner to the bag body 52 according to the first exemplary embodiment and, together with the webbing 42, is covered by the cover 60 (none of which is shown in FIG. 8A and FIG. 8B).

In the present exemplary embodiment with the structure described above, gas produced in the inflator 72 passes through the interior of the tube 96 that is narrower than the narrow width portion 95 and the main body portion 66. Therefore, the gas does not inflate the narrow width portion 95 while passing through the interior of the tube 96. Further, the position of the distal end of the tube 96 is specified to be at the length direction one side of the bag body 92 relative to the insertion hole 28 of the tongue 20 in the empty buckled state. Therefore, the tube 96 is not crushed by the folding of the bag body 92 at the insertion hole 28 of the tongue 20, the gas excellently and smoothly passes through to the distal end of the tube 96, and the gas is discharged from the distal end of the tube 96 toward the folding position of the bag body 92 in the insertion hole 28 of the tongue 20. Consequently, the gas may be supplied to the main body portion 66 efficiently, as a result of which pressure in the inflated state of the main body portion 66 can be increased and the main body portion 66 can be inflated and expanded quickly.

In the present exemplary embodiment, similarly to the first exemplary embodiment, the bag body 92 is inflated so as to fill the gaps S1, S2 and S3 (see FIG. 5) in the insertion hole 28 of the tongue 20. Consequently, the flow paths F1 and F2 (see FIG. 6) are formed in the bag body 92 at the two width direction sides and the thickness direction other side of the webbing 42. The gas passes through the flow paths F1 and F2; excess gas that cannot pass through the flow paths F1 and F2 circulates inside the bag body 92 toward the length direction one side of the bag body 92 relative to the distal end of the tube 96. Because the width dimensions of the main body portion 66 and narrow width portion 95 of the bag body 92 are substantially larger than the internal diameter dimension of the tube 96, the bag body 92 can be inflated and expanded by this excess gas. Therefore, leakages of gas from the bag body 92 may be suppressed and durability of the bag body 92 against the pressure of the gas and the like may be improved.

Fourth Exemplary Embodiment

Figure 9A:
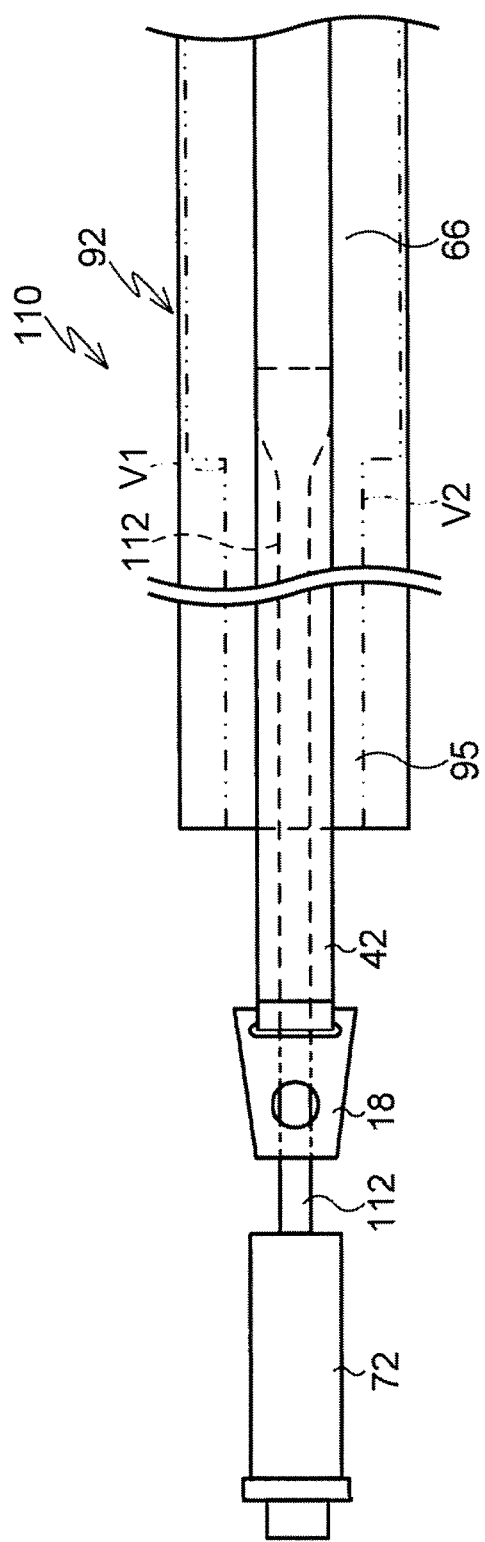
FIG. 9A is a plan view of a state in which a bag body of a seatbelt device in accordance with a fourth exemplary embodiment is widened.
Figure 9B:
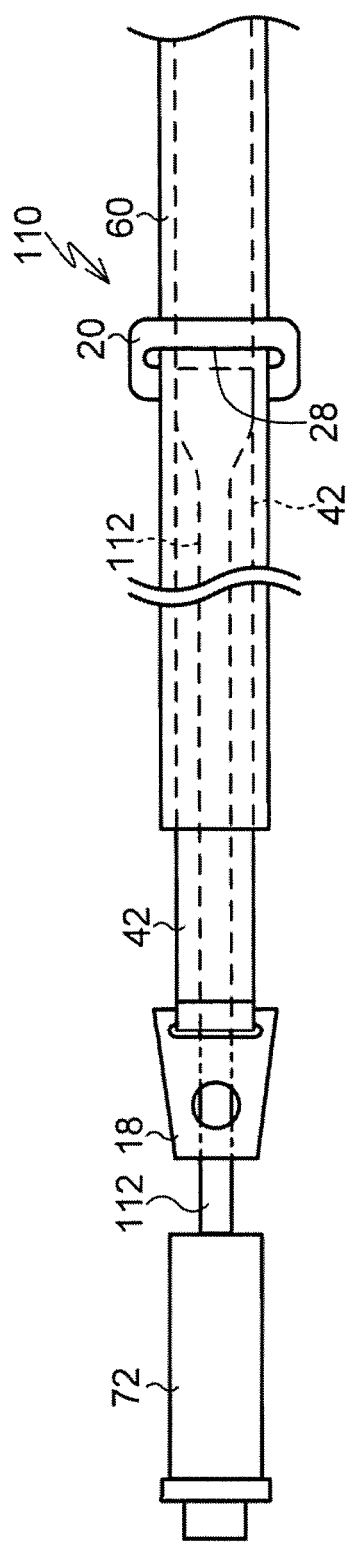
FIG. 9B is a plan view of a state in which a webbing and the bag body of the seatbelt device in accordance with the fourth exemplary embodiment are covered by a cover.
Figure 10:
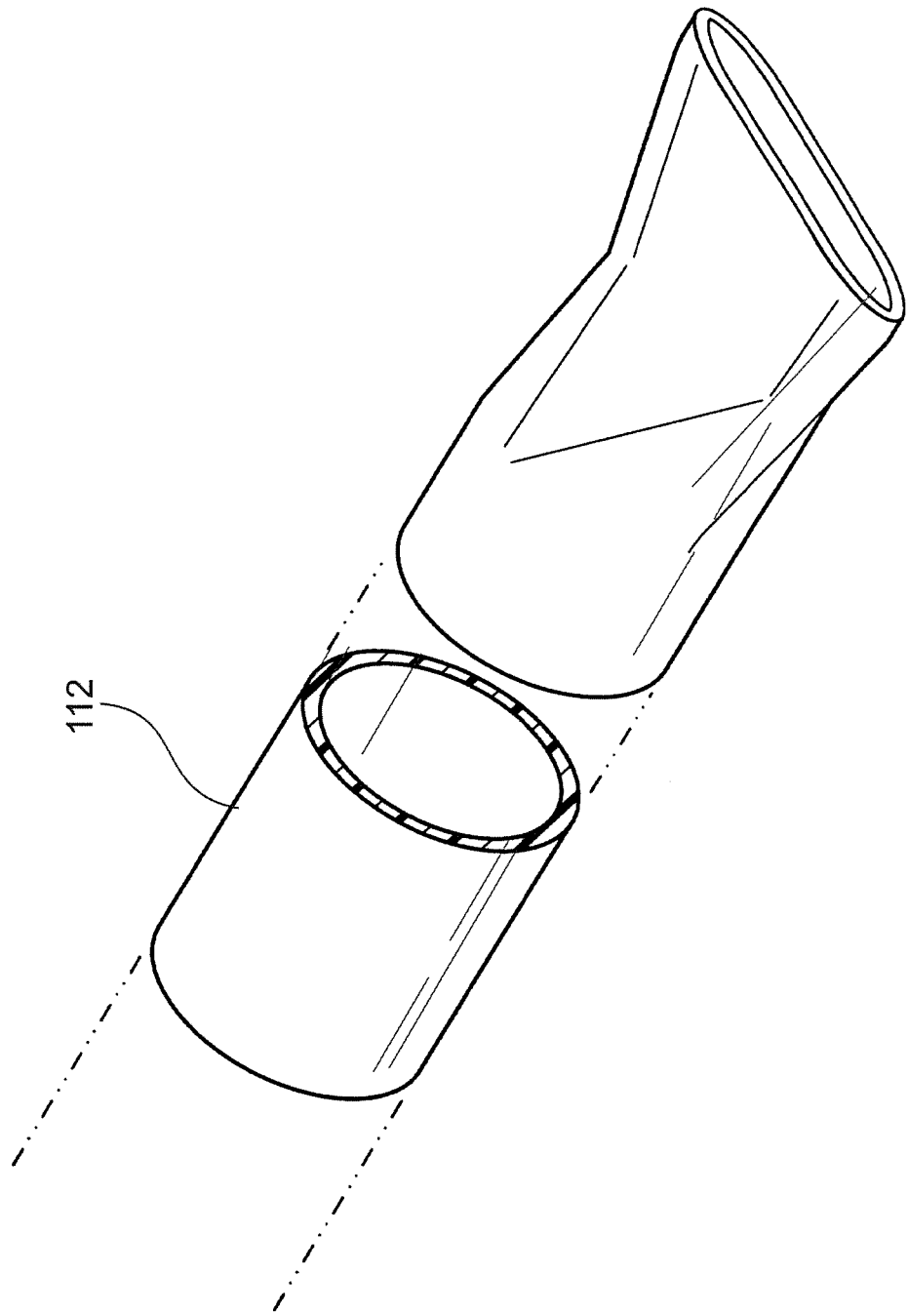
FIG. 10 is a perspective view in which a distal end side of a tubular member of the seatbelt device in accordance with the fourth exemplary embodiment is magnified.

As shown in FIG. 9A, a seatbelt device 110 according to a fourth exemplary embodiment is provided with a tube 112 that serves as the tubular member instead of the tube 96. As shown in FIG. 9A and FIG. 10, the distal end side of the tube 112 is formed in a flattened shape that is narrow in the thickness direction of the bag body 92. Therefore, the distal end side of the tube 112 has a longer dimension along the width direction of the bag body 92 than the proximal end side of the tube 112 and a shorter dimension along the thickness direction of the bag body 92 than the proximal end side of the tube 112. A cross-sectional area of the inside of the distal end of the tube 112 is smaller than a cross-sectional area of the inside of the proximal end side of the tube 112. As shown in FIG. 9B, the two width direction end portions of the distal end of the tube 112 are disposed at the two width direction end portion sides of the webbing 42 in the state in which the webbing 42 and the bag body 92 are covered by the cover 60.

The exemplary embodiment with the structure described above basically provide the same effects as the third exemplary embodiment. Moreover, in the present exemplary embodiment, because the distal end side of the tube 112 is formed in the flattened shape and the two width direction sides thereof are disposed at the two width direction end portion sides of the webbing 42, the gas may be efficiently discharged towards the deployment portions 65 of the bag body 92 (not shown in FIG. 9A and FIG. 9B). Therefore, both the deployment portions 65 can be efficiently inflated, the flow paths F1 and F2 are efficiently formed in the bag body 92, and the gas efficiently passes through the flow paths F1 and F2. Furthermore in the present exemplary embodiment, because the cross-sectional area of the inside of the distal end of the tube 112 is smaller than the cross-sectional area of the inside of the proximal end side, a discharge pressure of the gas being released from the distal end of the tube 112 is higher than the pressure where the gas is being supplied to the tube 112. Therefore, both the deployment portions 65 of the bag body 92 can be inflated even more efficiently, and the gas can pass through the flow paths F1 and F2 even more efficiently.

Fifth Exemplary Embodiment

As shown in FIG. 11, a seatbelt device 120 according to a fifth exemplary embodiment is provided with a tube 122 that serves as the tubular member instead of the tube 112. The distal end side of the tube 122 is squashed in the thickness direction of the bag body 92 (which is not shown in the drawing of FIG. 11). Thus, the distal end side of the tube 122 is formed in a flattened shape that is narrow in the thickness direction of the bag body 92. Portions at the width direction central region of the distal end side of the tube 122 that oppose one another in the thickness direction are fixed together by adhesive, thermal welding or the like. As a result, an inner periphery portion of the tube 122 is split into two branches at the distal end side. Thus, the gas is discharged from both a first aperture portion 124 at a width direction one side of the distal end of the tube 122 and a second aperture portion 126 at the width direction other side. Because the distal end side of the tube 122 is squashed, the sum of a cross-sectional area of the inside of the first aperture portion 124 and a cross-sectional area of the inside of the second aperture portion 126 is smaller than a cross-sectional area of the inside of the proximal end side of the tube 122.

The exemplary embodiment with the structure described above basically provide the same effects as the third exemplary embodiment. Moreover, in the present exemplary embodiment, because the distal end side of the tube 122 is squashed into the flattened shape, the first aperture portion 124 is closer to one of the deployment portions 65 of the bag body 92 and the second aperture portion 126 is closer to the other of the deployment portions 65 of the bag body 92 (neither of which is shown in FIG. 11). Furthermore, because the width direction central region of the tube 122 is fixed together at the distal end side of the tube 122, the gas is not discharged from the width direction central region of the distal end of the tube 122. As a result, the gas may be discharged efficiently towards the two deployment portions 65. Therefore, both the deployment portions 65 can be efficiently inflated and the flow paths F1 and F2 can be efficiently formed. Consequently, the gas can pass through the flow paths F1 and F2 efficiently.

In the present exemplary embodiment, the sum of the cross-sectional area of the inside of the first aperture portion 124 and the cross-sectional area of the inside of the second aperture portion 126 is smaller than the cross-sectional area of the inside of the proximal end side of the tube 122. Therefore, a discharge pressure of the gas being released from each of the first aperture portion 124 and the second aperture portion 126 is higher than the pressure where the gas is being supplied to the tube 122. Therefore, both the deployment portions 65 of the bag body 92 can be inflated even more efficiently, and the gas can pass through the flow paths F1 and F2 even more efficiently.

Sixth Exemplary Embodiment

Figure 12A:
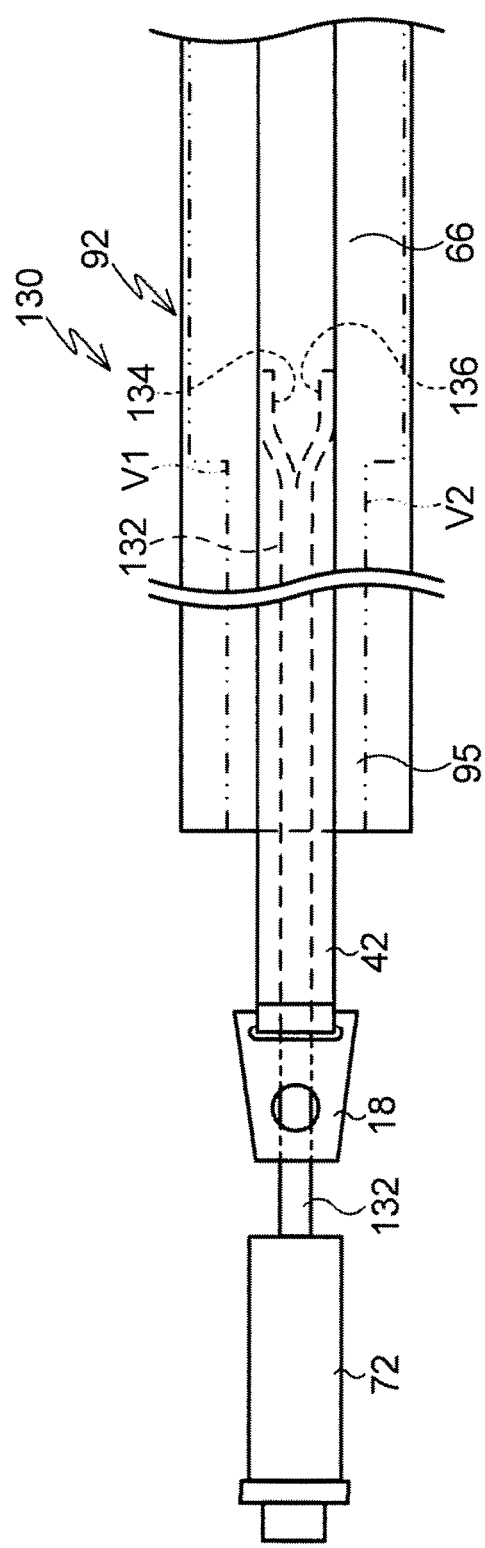
FIG. 12A is a plan view of a state in which a bag body of a seatbelt device in accordance with a sixth exemplary embodiment is widened.
Figure 13:
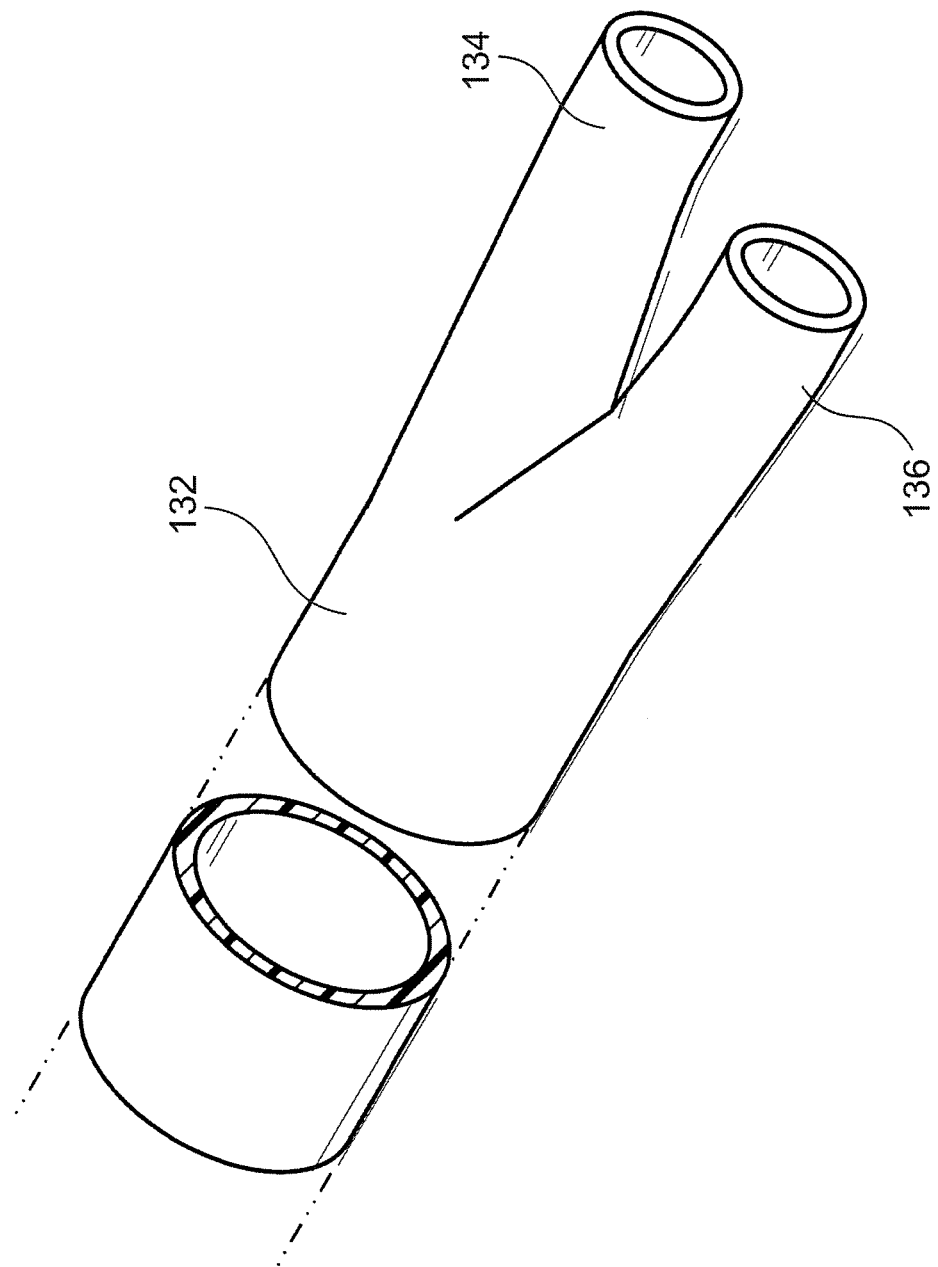
FIG. 13 is a perspective view in which a distal end side of a tubular member of the seatbelt device in accordance with the sixth exemplary embodiment is magnified.

As shown in FIG. 12A to FIG. 13, a seatbelt device 130 according to a sixth exemplary embodiment is provided with a tube 132 that serves as the tubular member instead of the tube 122. The tube 132 branches at the distal end side thereof into a first tube 134 and a second tube 136. As shown in FIG. 12B, the distal end of the first tube 134 is disposed at a side of the bag body 92 at which the one deployment portion 65 is disposed and the distal end of the second tube 136 is disposed at a side of the bag body 92 at which the other deployment portion 65 is disposed. The sum in the tube 132 of a cross-sectional area of the inside of the distal end of the first tube 134 and a cross-sectional area of the inside of the distal end of the second tube 136 is smaller than a cross-sectional area of the inside of the proximal end side of the tube 132.

The exemplary embodiment with the structure described above can basically provide the same effects as the third exemplary embodiment. In the present exemplary embodiment, the distal end of the first tube 134 of the tube 132 is disposed at the side of the bag body 92 at which the one deployment portion 65 is disposed and the distal end of the second tube 136 is disposed at the side of the bag body 92 at which the other deployment portion 65 is disposed (neither of which is shown in FIG. 12A to FIG. 13). As a result, the gas can be discharged efficiently towards the two deployment portions 65. Therefore, both the deployment portions 65 can be efficiently inflated and the flow paths F1 and F2 can be efficiently formed. Consequently, the gas pass through the flow paths F1 and F2 efficiently.

In the present exemplary embodiment, the sum of the cross-sectional area of the inside of the distal end of the first tube 134 and the cross-sectional area of the inside of the distal end of the second tube 136 is smaller than the cross-sectional area of the inside of the proximal end side of the tube 132. Therefore, a discharge pressure of the gas being released from each of the first tube 134 and the second tube 136 is higher than the pressure where the gas is being supplied to the tube 132. Therefore, both the deployment portions 65 of the bag body 92 can be inflated even more efficiently, and the gas can pass through the flow paths F1 and F2 even more efficiently.

Seventh Exemplary Embodiment

Figure 14:
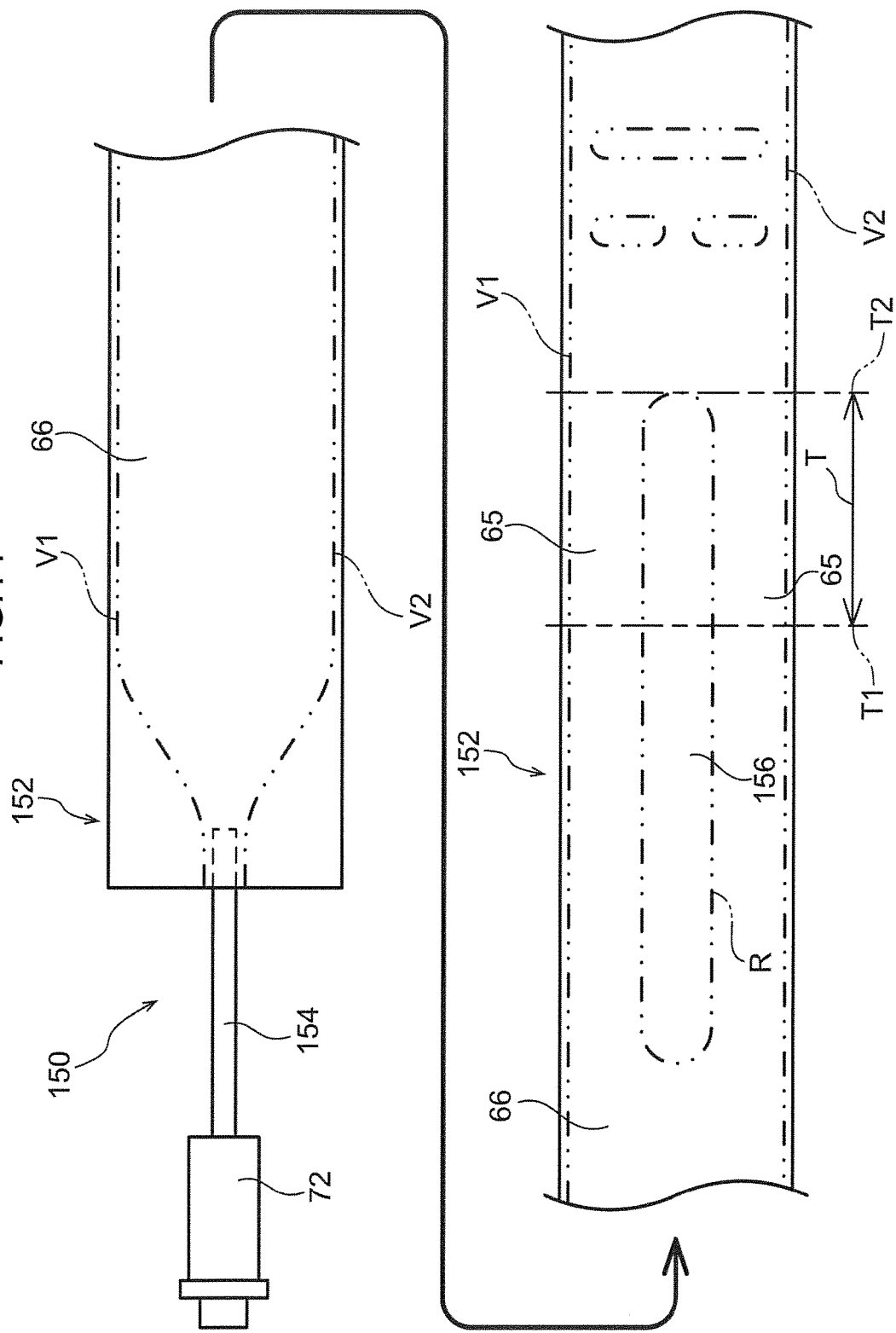
FIG. 14 is a plan view of a state in which a bag body of a seatbelt device in accordance with a seventh exemplary embodiment is widened.

As shown in FIG. 14, a bag body 152 of a seatbelt device 150 according to a seventh exemplary embodiment is similar to the bag body 52 according to the first exemplary embodiment in being a bag body in which a portion between imaginary lines V1 and V2 is formed as two layers and the width direction outer sides relative to the imaginary lines V1 and V2 are formed as a single layer. However, the bag body 152 is not provided with the gas passage portion 62 and the intermediate passage portion 64. Instead, the spacing between the imaginary lines V1 and V2 of the bag body 152 narrows at a vicinity of the length direction one end. At the length direction one end of the bag body 152 and the vicinity thereof, the spacing between the imaginary lines V1 and V2 is set to a size that fits round the distal end side of a tube 154. In contrast to the tube 96 according to the third exemplary embodiment, the distal end side of the tube 154 does not reach the vicinity of the insertion hole 28 of the tongue 20 in the empty buckled state.

In the state in which the webbing 42 and the bag body 152 are applied to the body of the vehicle occupant 44 (see FIG. 1), the folding position of the bag body 152 at the insertion hole 28 of the tongue 20 is assumed to be within a range T between the single-dot chain line T1 and the single-dot chain line T2 in FIG. 14.

Figure 15:
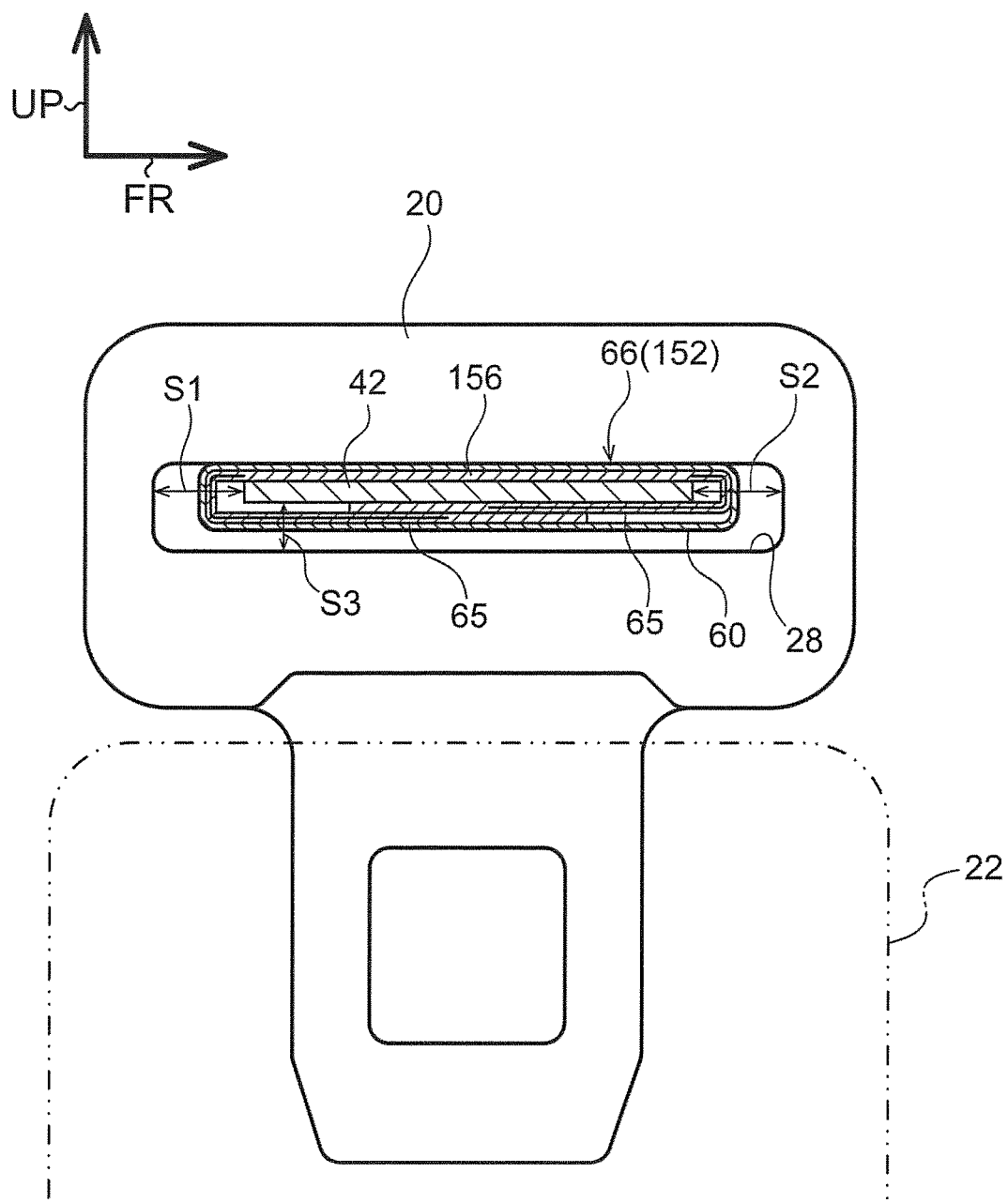
FIG. 15 is a sectional view of a portion of a webbing and the bag body of the seatbelt device in accordance with the seventh exemplary embodiment that is inserted through an insertion hole of a tongue.

A non-inflating portion 156 is formed in the bag body 152. The non-inflating portion 156 is formed at the inside of the ring-shaped imaginary line R in FIG. 14. In the non-inflating portion 156, the bag body 152 is formed into a single layer (a single cloth) by a joining thread constituted of one or both of a weft and a warp that form the bag body 152. Consequently, the non-inflating portion 156 cannot inflate even when the gas is supplied into the bag body 152. The non-inflating portion 156 is formed at a position in the length direction of the bag body 152 that encompass the range T of the folding position of the bag body 152 that is assumed to locate at the insertion hole 28 of the tongue 20, and the non-inflating portion 156 is formed at the width direction central side of the bag body 152. A width dimension of the non-inflating portion 156 corresponds with a width dimension of the webbing 42. Thus, as shown in FIG. 15, the webbing 42 opposes the non-inflating portion 156 at the thickness direction one side of the webbing 42, and the bag body 152 at the two width direction sides of the non-inflating portion 156 serves as the deployment portions 65.

In the present exemplary embodiment with the structure described above, gas that is produced in the inflator 72 passes through the interior of the tube 154 and is discharged into the main body portion 66 of the bag body 152. As a result, the main body portion 66 of the bag body 152 inflates. However, even though the gas is supplied to the interior of the bag body 152, the non-inflating portion 156 that is formed at the width direction central side of the bag body 152 cannot inflate. Therefore, the gas passes through while inflating the deployment portions 65 at the two width direction sides of the non-inflating portion 156.

Consequently, at the folding position of the bag body 152 at the insertion hole 28 of the tongue 20, the bag body 152 does not inflate at the thickness direction one side of the webbing 42 and the deployment portions 65 may be efficiently inflated by the pressure of the gas. Therefore, in the present exemplary embodiment, the flow paths F1 and F2 for the gas can be formed efficiently (see FIG. 6). Thus, the length direction other side of the bag body 152 relative to the folding position at the insertion hole 28 of the tongue 20 (the side at which the shoulder belt anchor 16 is disposed) can be efficiently inflated and expanded.

Eighth Exemplary Embodiment

Figure 16:
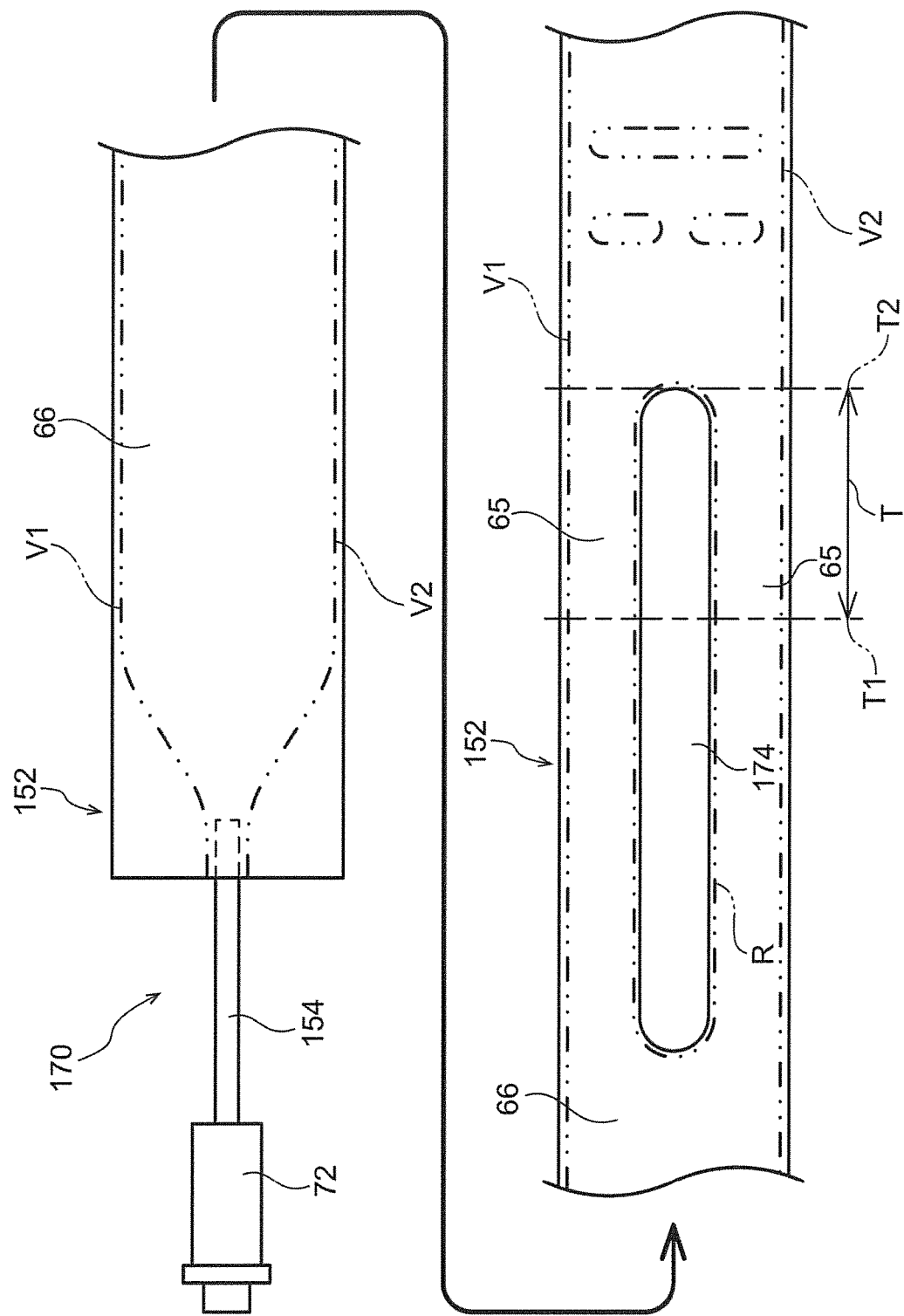
FIG. 16 is a plan view of a state in which a bag body of a seatbelt device in accordance with an eighth exemplary embodiment is widened.

As shown in FIG. 16, in a bag body 172 of a seatbelt device 170 according to an eighth exemplary embodiment, a non-inflating portion 174 is formed instead of the non-inflating portion 156. The non-inflating portion 174 is inside the ring-shaped imaginary line R in FIG. 16; a range of formation of the non-inflating portion 174 is the same as that of the non-inflating portion 156 according to the sixth exemplary embodiment. However, in the present exemplary embodiment, the bag body 172 is not formed inside the imaginary line R; a hole is formed. This structure too can provide the same operations and effects as the seventh exemplary embodiment.

Ninth Exemplary Embodiment

Figure 17:
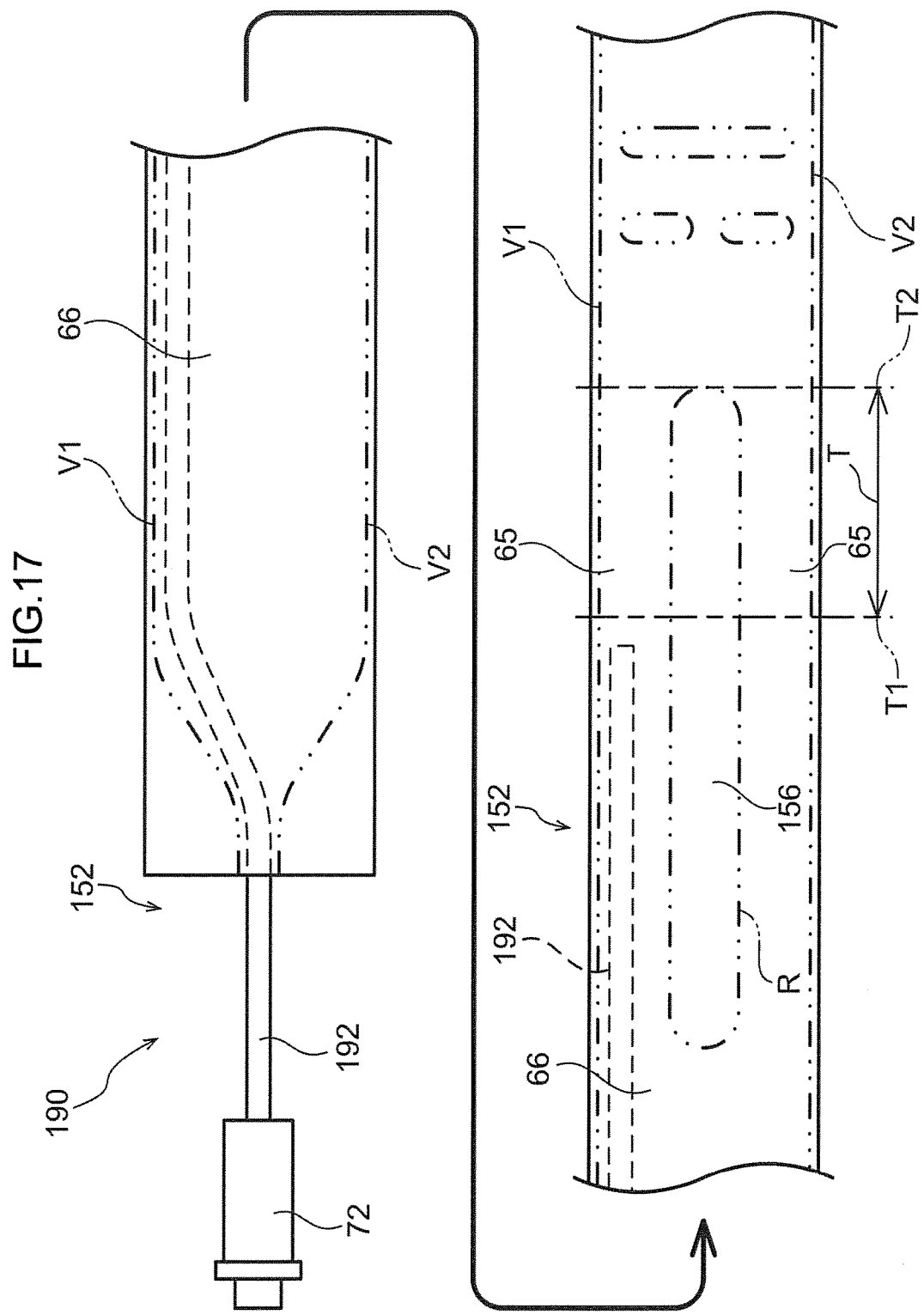
FIG. 17 is a plan view of a state in which a bag body of a seatbelt device in accordance with a ninth exemplary embodiment is widened.

As shown in FIG. 17, in the bag body 152 of a seatbelt device 190 according to a ninth exemplary embodiment, a tube 192 is provided to serve as the tubular member. Unlike the tube 154 according to the seventh exemplary embodiment, the distal end of the tube 192 reaches a vicinity of the expected range T of the folding position of the bag body 152 at the insertion hole 28 of the tongue 20. The tube 192 is inserted inside of the bag body 152, into the deployment portion 65 that is at an imaginary line V1 side relative to the non-inflating portion 156.

In the present exemplary embodiment with the structure described above, gas that is produced in the inflator 72 passes through the interior of the tube 192 and is discharged into the deployment portion 65 at the imaginary line V1 side of the bag body 152. Further in the present exemplary embodiment, the non-inflating portion 156 that is formed at the width direction central side of the main body portion 66 of the bag body 152 cannot inflate. Therefore, in the present exemplary embodiment, the deployment portion 65 at the imaginary line V1 side can be efficiently inflated and expanded, and the flow path F1 for the gas (see FIG. 6) can be efficiently formed. Hence, the length direction other side of the bag body 152 relative to the folding position at the insertion hole 28 of the tongue 20 can be efficiently inflated and expanded.

Tenth Exemplary Embodiment

Figure 18:
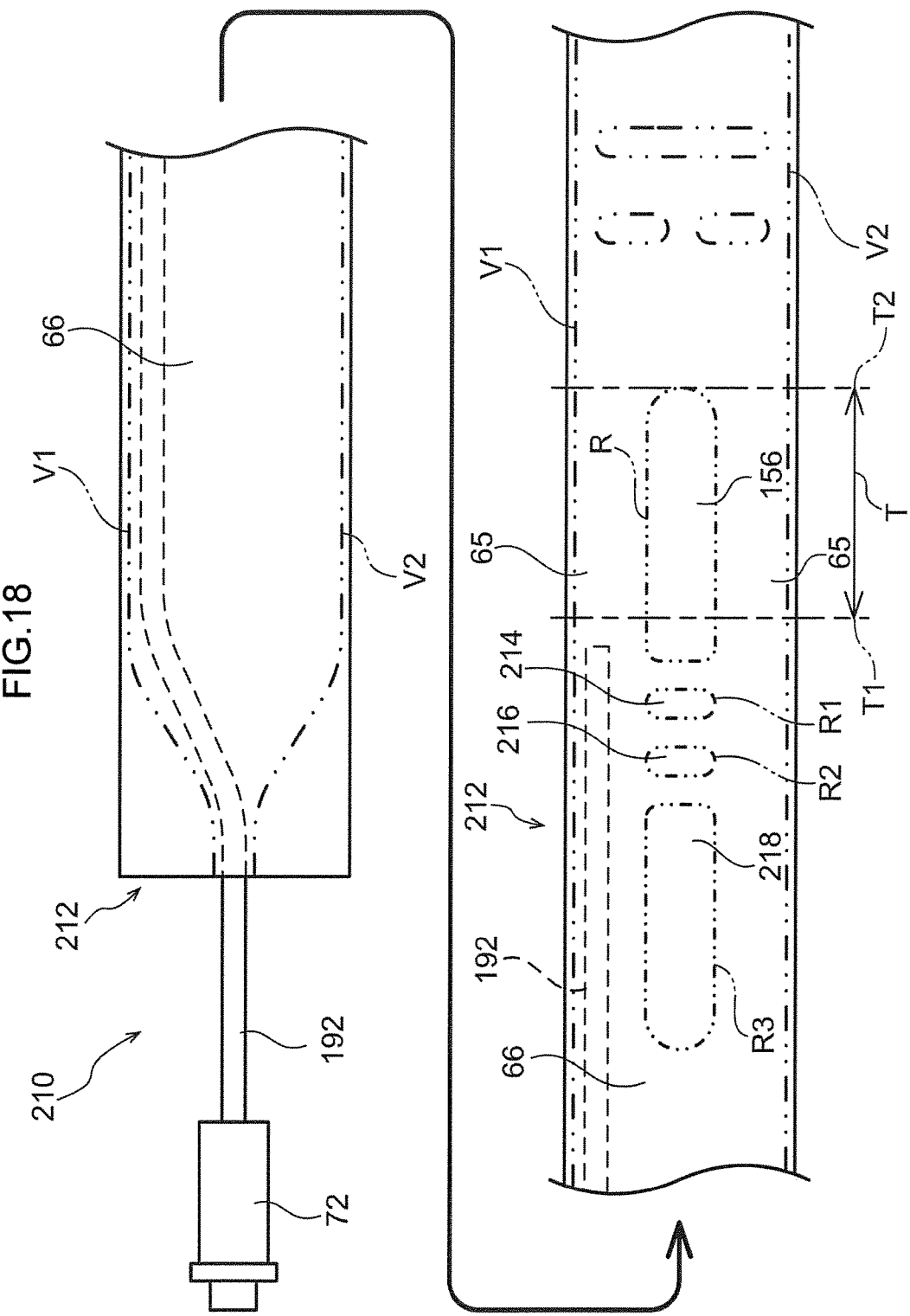
FIG. 18 is a plan view of a state in which a bag body of a seatbelt device in accordance with a tenth exemplary embodiment is widened.

As shown in FIG. 18, in a bag body 212 of a seatbelt device 210 according to a tenth exemplary embodiment, further non-inflating portions 214, 216 and 218 are formed. The non-inflating portions 214, 216 and 218 are formed at the width direction central side of the bag body 212, at the length direction one side of the bag body 212 relative to the non-inflating portion 156. The non-inflating portions 214, 216 and 218 are formed inside the ring-shaped imaginary lines R1, R2 R3 in FIG. 18. The non-inflating portions 156, 214, 216 and 218 are formed to be spaced by predetermined spacings in the length direction of the bag body 212. Accordingly, the bag body 212 between the non-inflating portions 156, 214, 216 and 218 can be inflated by the pressure of the gas. Thus, the gas can pass through from the imaginary line V1 side to the imaginary line V2 side relative to the non-inflating portions 156, 214, 216 and 218.

In the present exemplary embodiment with the structure described above, gas that is produced in the inflator 72 passes through the interior of the tube 192 and is discharged into the deployment portion 65 at the imaginary line V1 side of the bag body 212. Further in the present exemplary embodiment, the non-inflating portions 156, 214, 216 and 218 that are formed at the width direction central side of the main body portion 66 of the bag body 212 cannot inflate. Therefore, in the present exemplary embodiment, the deployment portion 65 at the imaginary line V1 side can be efficiently inflated and expanded, and the flow path F1 for the gas (see FIG. 6) can be efficiently formed. A portion of the gas discharged from the distal end of the tube 192 passes through between the non-inflating portions 156, 214, 216 and 218, flows into the deployment portion 65 at the imaginary line V2 side relative to the non-inflating portions 156, 214, 216 and 218, and inflates and expands the deployment portion 65 at the imaginary line V2 side. As a result, the flow path F2 for the gas (see FIG. 6) can be efficiently formed, the length direction other side of the bag body 212 relative to the folding position at the insertion hole 28 of the tongue 20 can be efficiently inflated and expanded by the gas flowing through the flow paths F1 and F2, and the bag body 212 can be inflated relatively equally at the imaginary line V1 side and the imaginary line V2 side of the non-inflating portions 156, 214, 216 and 218.

Because a portion of the gas discharged from the tube 192 passes through between the non-inflating portions 156, 214, 216 and 218, the length direction other side of the bag body 212 relative to the folding position at the insertion hole 28 of the tongue 20 may be inflated and expanded relatively quickly. Therefore, an excessive increase in pressure of the gas in the vicinity of the folding position of the bag body 212 at the insertion hole 28 of the tongue 20 can be prevented or suppressed.

Eleventh Exemplary Embodiment

Figure 19:
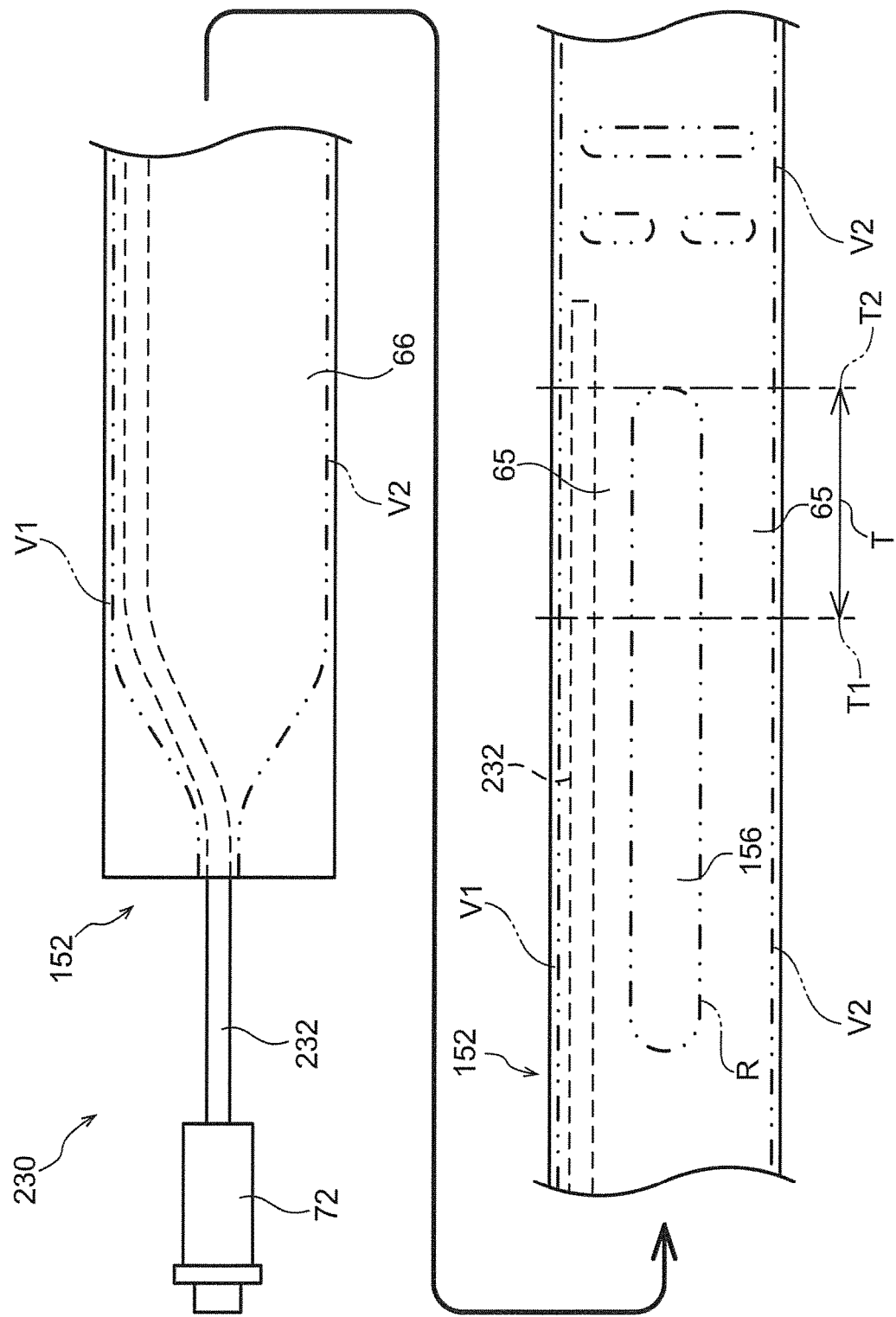
FIG. 19 is a plan view of a state in which a bag body of a seatbelt device in accordance with an eleventh exemplary embodiment is widened.
Figure 20:
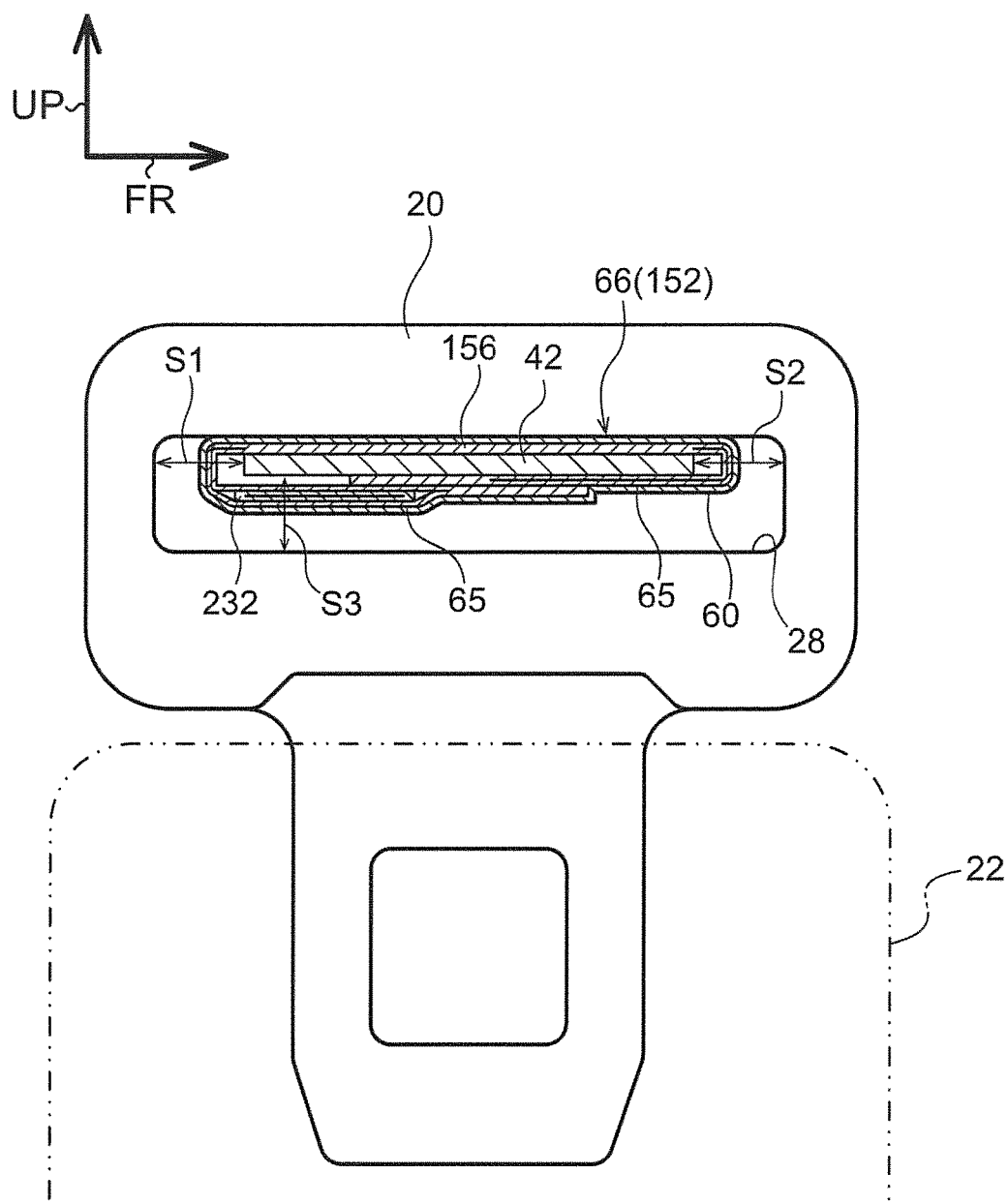
FIG. 20 is a sectional view of a portion of a webbing and the bag body of the seatbelt device in accordance with the eleventh exemplary embodiment that is inserted through an insertion hole of a tongue.

As shown in FIG. 19, in a bag body 152 of a seatbelt device 230 according to an eleventh exemplary embodiment, a tube 232 is provided to serve as the tubular member instead of the tube 192. The distal end side of the tube 232 is disposed in the deployment portion 65 that is at an imaginary line V1 side. At the folding position of the bag body 152 at the insertion hole 28 of the tongue 20, as shown in FIG. 20, the distal end of the tube 232 is disposed at the thickness direction other side of the webbing 42 together with the deployment portion 65. As shown in FIG. 19, the distal end of the tube 232 is disposed at the length direction other side relative to the expected range T of the folding position of the bag body 152 at the insertion hole 28 of the tongue 20.

In the present exemplary embodiment with the structure described above, because the distal end of the tube 232 is disposed at the length direction other side of the bag body 152 relative to the expected range T of the folding position at the insertion hole 28 of the tongue 20, the gas may be efficiently supplied to the length direction other side relative to the folding position of the bag body 152 at the insertion hole 28 of the tongue 20. Hence, the length direction other side of the bag body 152 relative to the folding position at the insertion hole 28 of the tongue 20 may be efficiently inflated and expanded.

Because the tube 232 is disposed at the thickness direction other side of the webbing 42 at the folding position of the bag body 152 at the insertion hole 28 of the tongue 20, even when the webbing 42 is subjected to tension, the tube 232 is not sandwiched between the webbing 42 and a periphery portion of the insertion hole 28 of the tongue 20, and the tube 232 is not pressed toward the side thereof at which the insertion hole 28 is disposed. Therefore, crushing of the tube 232 as a result of the webbing 42 being subjected to tension may be prevented or effectively suppressed, and the gas passes through the tube 232 efficiently. Consequently, the length direction other side of the bag body 152 relative to the folding position at the insertion hole 28 of the tongue 20 can be inflated and expanded even more efficiently.

Although the non-inflating portion 156 is formed in the bag body 152 in the present exemplary embodiment, a structure is possible in which the tube 232 is provided at the deployment portion 65 but the non-inflating portion 156 is not formed in the bag body 152.

The third to eleventh exemplary embodiments have structures in which the tongue 20 serves as the anchor member and the gas is supplied to the bag body 92, 152, 172 or 212 from the side at which the anchor plate 18 is disposed relative to the tongue 20. However, the present invention may be applied to a structure in which, for example, the shoulder belt anchor 16 serves as the anchor member and the gas is supplied from the side of the shoulder belt anchor 16 at which the webbing take-up device 14 is disposed. If a structure is employed in which the shoulder belt anchor 16 serves as the anchor member in any of the third to tenth exemplary embodiments and the gas is supplied from the side at which the webbing take-up device 14 is disposed relative to the shoulder belt anchor 16, it is sufficient that the tube 96, 112, 122, 132 or 192 be inserted through an opening at the side of the bag body 92, 152, 172 or 212 at which the webbing take-up device 14 is disposed, and that the distal end of the tube 96, 112, 122, 132 or 192 be disposed at the side at which the webbing take-up device 14 is disposed relative to the insertion hole of the shoulder belt anchor 16.

In the exemplary embodiments described above, the bag body 52, 82, 92, 152, 172 or 212 is formed by double cloth. However, the structure of the bag body 52, 82, 92, 152, 172 or 212 is not limited to this mode. For example, a bag body may be formed by sewing together two sheet members, or a bag body may be formed by molding a synthetic resin material into a bag shape; structures other than structures based on double weavings may broadly be employed as structures of the bag body.

In the exemplary embodiments described above, the tube 96, 112, 122, 132, 192 or 232 that serves as the tubular member may be a structure that is formed in a tube shape of a synthetic resin material, or may be a structure that is formed in a tube shape by two sheets of a fabric for forming the bag body 52, 82, 92, 152, 172 or 212 and the same fabric being superposed and sewn or joined together. Various structures may be broadly employed.

The disclosures of Japanese Patent Application No. 2013-217700 are incorporated into the present specification by reference in their entirety.

All references, patent applications and technical specifications cited in the present specification are incorporated by reference into the present specification to the same extent as if the individual references, patent applications and technical specifications were specifically and individually recited as being incorporated by reference.

The invention claimed is:

1. A seatbelt device comprising:
   a webbing being configured to be applied to the body of a vehicle occupant sitting on a seat;
   a bag body disposed along a length direction of the webbing, the bag body being disposed in a thickness direction at one side of the webbing, the bag body being folded over width direction outer sides of the webbing so as to be disposed over another side of the webbing in a thickness direction, the bag body being inflatable by pressure of a fluid supplied from a length direction one side of the bag body, and a deployment portion through which the fluid can pass being provided at the bag body, the deployment portion being disposed at the width direction outer side and the thickness direction other side of the webbing; and
   an anchor member in which an insertion hole is formed, the webbing and the bag body being inserted through the insertion hole, the webbing being folded back at the thickness direction one side of the webbing as an inner side of the folding back at the insertion hole when the webbing is applied to the body of the sitting vehicle occupant, and the deployment portion of the bag body being disposed inside the insertion hole.

2. The seatbelt device according to claim 1, wherein the bag body comprises a non-inflating portion that cannot be inflated, the non-inflating portion being formed in the bag body at the thickness direction one side of the webbing, and the non-inflating portion being located at a position in a length direction of the bag body such that a folding position of the bag body at the anchor member is encompassed in the position when the webbing is applied to the body of the sitting vehicle occupant.

3. The seatbelt device according to claim 1, wherein the bag body further comprises:
   a main body portion that is configured to inflate at a chest front side of the vehicle occupant when the webbing is applied to the body of the sitting vehicle occupant; and
   a fluid passage portion that is provided at the length direction one side of the bag body relative to the main body portion, a width dimension of the fluid passage portion being smaller than a width dimension of the main body portion, and the fluid passing through the fluid passage portion and flowing into the main body portion.

4. The seatbelt device according to claim 3, wherein the bag body further comprises an intermediate passage portion provided between the main body portion and fluid passage portion,
   the intermediate passage portion being insertable through the insertion hole in the state in which the webbing is applied to the body of the vehicle occupant,
   a width dimension of the intermediate passage portion being smaller than the width dimension of the main body portion and larger than the width dimension of the fluid passage portion, and the fluid passing through the intermediate passage portion from the fluid passage portion toward the main body portion.

5. The seatbelt device according to claim 1, further comprising a tubular member that is provided with a distal end and a proximal end,
   wherein the tubular member being structured such that, when the webbing is applied to the body of the sitting vehicle occupant, the distal end of the tubular member is disposed in the bag body at the length direction one side of the bag body relative to the insertion hole of the anchor member and the proximal end is disposed further to the length direction one side of the bag body than the distal end, and
   the fluid being supplied into the tubular member from the proximal end and the tubular member discharging the fluid from the distal end into the bag body.

6. The seatbelt device according to claim 5, wherein the distal end of the tubular member is disposed at a side of the bag body at which the deployment portion is disposed.

7. The seatbelt device according to claim 1, further comprising a tubular member,
   wherein the tubular member being structured such that, when the webbing is applied to the body of the sitting vehicle occupant, a distal end side of the tubular member is provided inside the deployment portion of the bag body and is disposed at the length direction other side relative to a folding position of the bag body at the anchor member, and a proximal end of the tubular member is disposed at the length direction one side of the bag body relative to the distal end, and
   the fluid being supplied into the tubular member from the proximal end and the tubular member discharging the fluid from the distal end into the bag body.

8. The seatbelt device according to claim 5, wherein the length direction one side of the bag body relative to the distal end of the tubular member can be inflated by pressure of the fluid.

9. The seatbelt device according to claim 1, wherein the bag body, when deployed, extends beyond the outer sides of the webbing.

10. The seatbelt device according to claim 1, wherein the bag body, when deployed, directly contacts the body of a user of the seatbelt device.

* * * * *